(12) United States Patent
Fellner et al.

(10) Patent No.: US 9,817,605 B2
(45) Date of Patent: Nov. 14, 2017

(54) SYSTEMS AND METHODS OF STORING DATA ASSOCIATED WITH CONTENT OF A DATA STORAGE DEVICE

(71) Applicant: SANDISK TECHNOLOGIES INC., Plano, TX (US)

(72) Inventors: Michael Fellner, Beer-Sheva (IL); Itai Dror, Omer (IL)

(73) Assignee: SANDISK TECHNOLOGIES LLC, Plano, TX (US)

( * ) Notice: Subject to any disclaimer, the term of this patent is extended or adjusted under 35 U.S.C. 154(b) by 477 days.

(21) Appl. No.: 14/155,617

(22) Filed: Jan. 15, 2014

(65) Prior Publication Data

US 2015/0178310 A1    Jun. 25, 2015

Related U.S. Application Data

(60) Provisional application No. 61/920,390, filed on Dec. 23, 2013.

(51) Int. Cl.
*G06F 17/30* (2006.01)
*G06F 3/06* (2006.01)

(52) U.S. Cl.
CPC ............ *G06F 3/065* (2013.01); *G06F 17/301* (2013.01); *G06F 17/30115* (2013.01)

(58) Field of Classification Search
CPC combination set(s) only.
See application file for complete search history.

(56) References Cited

U.S. PATENT DOCUMENTS

| | | |
|---|---|---|
| 2006/0112018 A1 | 5/2006 | Lee |
| 2006/0288036 A1 | 12/2006 | Sadovsky et al. |
| 2007/0156778 A1 | 7/2007 | Archer et al. |
| 2009/0287710 A1 | 11/2009 | Van Den Boome et al. |
| 2011/0090277 A1 | 4/2011 | Pomerantz et al. |
| 2011/0252071 A1* | 10/2011 | Cidon ............... G06F 17/30174 707/802 |
| 2012/0254340 A1 | 10/2012 | Velummylum et al. |
| 2014/0082749 A1* | 3/2014 | Holland ................. G06F 21/60 726/29 |
| 2014/0122544 A1* | 5/2014 | Tran ........................ G06F 21/10 707/825 |

FOREIGN PATENT DOCUMENTS

WO    2011117465 A1    9/2011

\* cited by examiner

*Primary Examiner* — Shyue Jiunn Hwa
(74) *Attorney, Agent, or Firm* — Toler Law Group, PC

(57) ABSTRACT

A method performed in a host device includes receiving an input based on a user-visible code associated with a data storage device. The user-visible code corresponds to an identifier of the data storage device. The method includes sending first data associated with the identifier to a server via a network and receiving, from the server at a first time, a copy of second data identifying content stored in the data storage device. The second data is stored in a network-based storage device associated with the server. The method includes displaying, via a user interface of the host device, an indication of the content of the data storage device to enable the content of the data storage device to be identified at the host device independently of whether the data storage device is coupled to the host device.

20 Claims, 12 Drawing Sheets

SYSTEMS AND METHODS OF STORING DATA ASSOCIATED WITH CONTENT OF A DATA STORAGE DEVICE

CROSS-REFERENCE TO RELATED APPLICATIONS

The present application claims priority to U.S. Provisional Application No. 61/920,390 filed Dec. 23, 2013, which application is hereby incorporated by reference in its entirety.

FIELD OF THE DISCLOSURE

The present disclosure is generally related to storing data associated with content of a data storage device.

BACKGROUND

Non-volatile data storage devices, such as embedded memory devices (e.g., embedded MultiMedia Card (eMMC) devices) and removable memory devices (e.g., removable universal serial bus (USB) flash memory devices and other removable storage cards), have allowed for increased portability of data and software applications. Users of non-volatile data storage devices increasingly rely on the non-volatile storage devices to store and provide rapid access to a large amount of data. For example, a user may store audio files, images, videos, and other files at a data storage device.

To determine what content is stored on a particular data storage device, a user either has to remember what files were stored on the particular data storage device or connect the particular data storage device to a host device that includes a user interface (e.g., a display) to view the content of the particular data storage device. Typically, a particular user may use and/or own multiple data storage devices. If the user has many data storage devices, the user may have a difficult time remembering specific content that is stored on each of the data storage devices.

Connecting a particular data storage device to a host device to determine the content of the particular data storage device may take several minutes. For example, time is needed for the host device to recognize the particular data storage device, to communicatively couple the particular data storage device to the host device, to determine the content of the particular data storage device, and to present the content. After the user has viewed the contents of the particular data storage device, further time is involved to decouple the particular data storage device from the host device. Additionally, when a user wants to identify one of the multiple data storage devices that store a particular content item (e.g., a specific file), the user may have to sequentially couple each of the data storage devices to the host device and search each data storage device to locate the particular content item. Accordingly, determining the content of multiple data storage devices and/or locating a particular content item stored in one of a plurality of data storage devices may be a time consuming processes.

SUMMARY

Techniques are disclosed for storing data associated with content of a data storage device. For example, a system for storing data associated with the content of a data storage device may include use of a host device and a cloud storage system (e.g., a cloud index service).

The host device may be configured to couple (e.g., physically or wirelessly) to the data storage device. The host device may include an application to determine whether the data storage device is registered with the cloud storage system. For example, the host device may receive an identifier (e.g., a media digital identifier) from the data storage device and may send the identifier to the cloud storage system. If the host device receives a message from the cloud storage system indicating that the data storage device is not registered, the host device may register the data storage device using the application. The application may generate directory information, such as a log file of the data storage device (e.g., a directory of content stored in the data storage device), and request a user to create (e.g., establish) a user-identifier that corresponds to the data storage device. Accordingly, the user-identifier (e.g., a user-identifiable designation) of the data storage device may be known to the user of the data storage device while the identifier (e.g., the media digital identifier) may be unknown to the user. The host device may send a copy of the directory information, the identifier, and the user-identifier to the cloud storage system for storage and to register the data storage device. The directory information and the user-identifier may also be sent from the host device to the data storage device for storage in a memory of the data storage device.

When a registered data storage device is coupled to the host device, the host device may request and receive a copy of a first version of the directory information (of the data storage device) that is stored in the cloud storage system. The host device may determine whether the version of the directory information reflects the content stored in the data storage device, such as based on a comparison between the version of the directory information (received from the cloud storage system) and another version of the directory information (stored in the data storage device). If the version of the directory information received from the cloud storage system does not reflect the content of the data storage device, the host device may update the version of the directory information stored in the cloud storage system to reflect the content stored in the data storage device. When the content of the data storage device changes, such as when data stored in the data storage device is modified, deleted, or added, the host device may send one or more updates to the cloud storage system.

The cloud storage system (e.g., a cloud-based storage service) may be configured to maintain an entry of each data storage device registered with the cloud storage system. The entry of a data storage device may include an identifier, a user-identifier, directory information (e.g., a log file), and/or other data storage device information (e.g., a model type, a year manufactured, a software version, etc.). One or more entries maintained by the cloud storage system may be searchable by an identifier value, by a user-identifier value, or by a file criteria associated with directory information. The one or more entries (e.g., entries that correspond to one or more storage devices) may correspond to a user account maintained by the cloud storage system. Access to the one or more entries of the user account may be restricted (e.g., requires a user to provide authentication information (e.g., a user name and/or password) to enable access to the user account). A user associated with the user account may access the cloud storage system to browse and query the one or more entries (e.g., entries that correspond to one or more data storage device) to determine which particular data storage device stores a particular file or particular content of interest.

A particular data storage device may include a label printed on, engraved on, or attached to the data storage device, such as on a housing of the particular data storage device. The label may be associated with an identifier (unknown to a user) or a user-identifier (known/designated by the user) of the particular data storage device. When the label is associated with the identifier, the label may include a quick response (QR) code, a micro-QR code, a radio frequency identifier (RFID), or a bar code. When the label is associated with the user-identifier, the label may include text, a symbol, or an image (e.g., a drawing or a picture). A particular host device, such as a host device that is not communicatively coupled to the particular data storage device, may use the label (e.g., via a label reader or scanner) to access a particular entry of the cloud storage system based on the label (e.g., a particular entry that corresponds to the particular data storage device). The particular host device may access the particular entry to obtain a copy of directory information (e.g., directory information that identifies content stored in the particular data storage device) stored in the cloud storage system. By using the label, the particular host device may quickly and efficiently access a version of the directory information of the particular data storage device and determine content that is stored in the particular data storage device without having to physically couple the particular data storage device to the host device (e.g., without having to physically plug in a memory card to an interface slot of the host device).

DETAILED DESCRIPTION

Particular embodiments of the present disclosure are described below with reference to the drawings. In the description, common features are designated by common reference numbers throughout the drawings.

Figure 1:
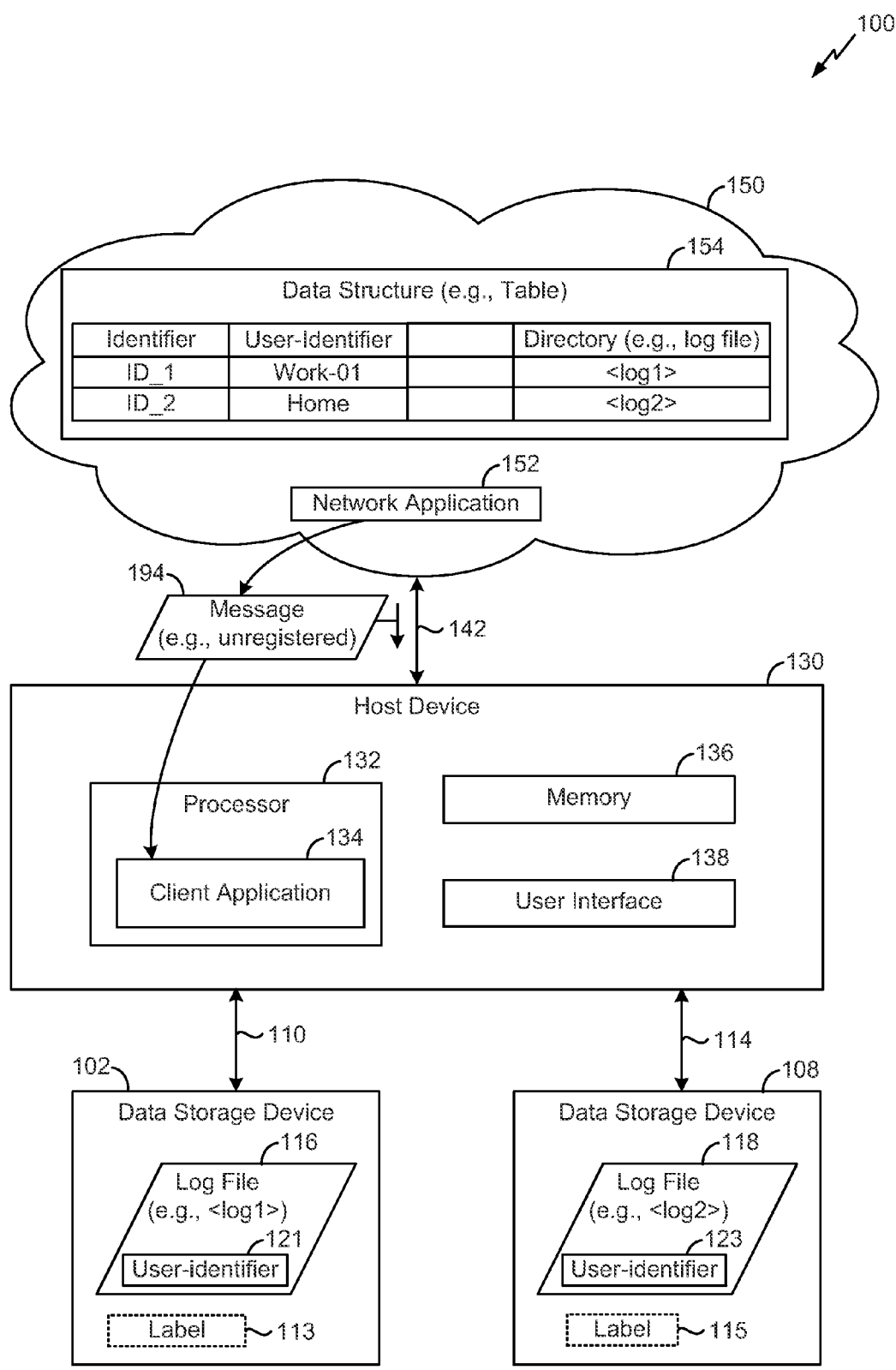
FIG. 1 is a block diagram of a first particular illustrative embodiment of a system including a data storage device, a host device, and a cloud storage system configured to store data associated with content of the data storage device.

FIG. 1 is a block diagram of a particular illustrative embodiment of a system 100 including a cloud storage system 150, a host device 130, and one or more data storage devices, such as a first data storage device 102 and a second data storage device 108. The system 100 may enable storage of and access to data associated with content stored in the one or more data storage devices.

In the system 100, each of the one or more data storage devices may be coupled to the host device 130 via a communication path, such as a wired communication path and/or a wireless communication path. For example, the first data storage device 102 may be coupled to the host device 130 (e.g., a first interface, such as a first wired interface or a first wireless interface) via a first communication path 110 and the second data storage device 108 may be coupled to the host device 130 (e.g., a second interface, such as a second wired interface or a second wireless interface) via a second communication path 114. To illustrate, the first communication path 110 may be a wired communication path and the second communication path 114 may be a wireless communication path. Accordingly, the first data storage device 102 and the second data storage device 108 may be coupled to the host device 130 concurrently. Alternatively, the host device 130 may include a single interface and only one of the data storage devices 102, 108 may be coupled to the host device 130 at a time. Either of the data storage devices 102, 108 may be embedded within the host device 130, such as in accordance with an embedded MultiMedia Card (eMMC®) (trademark of Joint Electron Devices Engineering Council (JEDEC) Solid State Technology Association, Arlington, Va.) configuration. Alternatively, either of the data storage devices 102, 108 may be removable from (i.e., "removably" coupled to) the host device 130. For example, the first data storage device 102 may be removably coupled to the host device 130 in accordance with a removable universal serial bus (USB) configuration. The host device 130 may issue one or more commands to the data storage devices 102, 108, such as one or more requests to read data from or write data to a memory of the first data storage device 102 or a memory of the second data storage device 108. The host device 130 may be coupled to the cloud storage system 150 via a network 142, such as a wireless network, a wired network, or a combination thereof.

The cloud storage system 150 (e.g., a cloud-based service) may be configured to maintain a record (e.g., a database) of data storage devices, such as the data storage devices 102, 108. The cloud storage system 150 may include a network application 152 and a data structure 154. The network application 152 may be executed by one or more computing devices, such as servers, that are included in or coupled to the cloud storage system 150. The data structure 154 may be configured as a table or other data structure to track one or more entries. Although the data structure 154 is illustrated as being a single data structure, the data structure 154 may be distributed throughout the cloud storage system 150, such as distributed throughout multiple network-based storage devices or servers included in or coupled to the cloud storage system 150, as described further with reference to FIG. 2.

Each entry (e.g., row) of the data structure 154 may correspond to a data storage device. Each entry may include an identifier (e.g., a unique media device identifier), a user-identifier (e.g., an identifier that is user-selectable and unique to a user), and directory information (e.g., a log file), as illustrative, non-limiting examples. To illustrate, a first entry of the data structure 154 may correspond to the first data storage device 102 and may include a first identifier (ID_1), a first user-identifier (Work-01), and first directory information (<log 1>). A second entry of the data structure 154 may correspond to the second data storage device 108 and may include a second identifier (ID_2), a second user-identifier (Home), and second directory information (<log 2>).

The directory information for a particular entry may include information associated with content stored in a corresponding data storage device at a time when the directory information was created or last updated. For example, the directory information associated with a particular data storage device may include, for at least one content item stored in a particular data storage device, a file name, a file type, a directory tree, and/or a media thumbnail (e.g., a graphical indicator of media content), as illustrative, non-limiting examples. As another example, the directory information may indicate a directory structure and file names of content stored in the particular data storage device. Additionally, the directory information may include a time stamp associated with a time that the directory information was created or last updated. Directory information stored in the cloud storage system 150 may be a copy (e.g., a remote copy) of corresponding directories or files on the data storage device, may include less information than the corresponding directories or files on the data storage device, or may be a "snapshot" of device content stored in the data storage device, such as an image including a thumbnail folder picture view of the content stored in the data storage device. Directory information stored in the data structure 154, when provided to a user (e.g., of the host device 130), may help the user recognize and/or determine the content stored in a particular data storage device without requiring the user to couple the particular data storage device to the host device 130.

The network application 152 may be configured to generate and maintain the data structure 154. For example, the network application 152 may be configured to register one or more data storage devices with the cloud storage system 150 and to initiate generation of an entry for each data storage device. The network application 152 may also be configured to update one or more entries of the data structure 154, such as by updating directory information of one or more entries.

Additionally or alternatively, the network application 152 may be configured to perform a search operation on the data structure 154 to identify one or more entries or to perform a look-up operation to identify a particular entry in the data structure 154. For example, the network application 152 may perform the search operation or the look-up operation based on a request received from the host device 130. To enable the network application 152 to search the entries of the data structure 154 or to look-up a particular entry of the data structure 154, the data structure 154 may be indexed to be searched by an identifier value, by a user-identifier value, and/or by a data value associated with the directory information. Based on the search operation or the look-up operation, the network application 152 may generate a result and may send the result (such as via a message) to the host device 130. Examples of performing searches and look-ups of directory information are further described with reference to FIG. 2.

The network application 152 may also be configured to generate and maintain one or more user accounts associated with the cloud storage system 150. For example, a user may use the host device 130 to create an account with the cloud storage system 150. The user account may include a user profile (e.g., contact information, demographic information, etc.) and may be associated with a set of entries included in the data structure 154. Alternately, the data structure 154 may be specific to the user, and the cloud storage system 150 may store such data structures for each registered user.

In a particular embodiment, the user account, the data structure 154, and/or a set of entries within the data structure 154 are associated with a social network service. The social network service may enable one user to communicate with or share account information with another user. Alternately, or in addition, users of the social network, or a sub-group thereof, may be able to search for and determine what content their "friends" have stored on data storage devices. When a set of entries in the data structure 154 are associated with a user account, a user name and password of the account may be needed to access the set of entries (e.g., to access the user account). Accordingly, information associated with the set of entries may be protected from unauthorized access by users that do not have the user name and/or password of the user account. An administrator of the cloud storage may have access to the information associated with the user account (e.g., the user profile and/or information from the set of entries, such as model information of data storage devices) and may use the information to communicate with the user of the user account. For example, the administrator may communicate with the user to inform the user of a software update for a particular data storage device, to inform the user of new products, or to provide the user with advertisement information, as illustrative, non-limiting examples.

The host device 130 may include a processor 132, a memory 136, and a user interface 138. The memory 136 may be configured to store data and/or instructions that may be executable by the processor 132. Although the memory 136 is illustrated as a single memory, the memory 136 may include one or more memories, such as one or more non-volatile memories, one or more volatile memories, or a combination thereof. The user interface 138 may be configured to receive data from and communicate data to a user of the host device 130. The user interface 138 may include a display, a touch pad, a microphone, a speaker, a key pad, a mouse, and/or a camera, as illustrative, non-limiting examples.

The processor 132 may include a client application 134. The client application 134 is illustrated as software that is executable by in the processor 132. The client application 134 may be implemented by hardware, software, and/or firmware, or a combination thereof. When the client application 134 includes software and/or firmware, the client application 134 may be stored in a memory, such as the memory 136. When the client application 134 includes software and/or firmware, the client application 134 may be downloaded from the cloud storage system 150 and stored in the memory 136 of the host device 130. An icon associated with the client application may be displayed via the user interface 138. A selection of the icon by a user of the host device 130 may cause the client application 134 to be launched (e.g., executed).

The client application 134 may be configured to register a data storage device, such as the first data storage device 102 or the second data storage device 108 with the cloud storage system 150, to generate directory information corresponding to a data storage device, and/or to initiate an update to the data structure 154. For example, when the host device 130 is coupled to a data storage device, the client application 134 may request and receive an identifier (e.g., a unique media device identifier) of the data storage device.

The client application 134 may send the identifier to the cloud storage system 150 (e.g., to the network application 152) to determine if the data storage device is registered with the cloud storage system 150. If the data storage device is registered, the host device 130 may receive directory information associated with the registered data storage device from the cloud storage system 150.

If the data storage device is not registered, the host device 130 may receive a message 194 from the cloud storage system 150 indicating that the data storage device is unregistered. In response to the message 194, the client application 134 may register the particular data storage device.

To register the data storage device, the client application 134 may prompt a user of the host device 130 to select or enter a user-identifier for the data storage device. The client application 134 may also generate directory information, such as a log file, associated with the data storage device. The directory information may be generated based on content stored in the data storage device. To illustrate, the directory information may include or may be based on a directory of the content. For example, when the content includes a plurality of files, the directory information may include a timestamp indicating when the directory information was generated, a number of files, an amount of data collectively stored in the plurality of files, and a last file added, deleted, and/or modified, as illustrative, non-limiting examples. Additionally or alternatively, for each file of the plurality of files, the directory information may include metadata including a file name, a thumbnail, a file description, a file owner, a creation date, a size, and/or comments, as illustrative, non-limiting examples. The client application 134 may send information to the network application 152. The network application 152 may register the data storage device and create an entry in the data structure 154 that corresponds to the data storage device, such as an entry that includes the identifier, the user-identifier, and the directory information of the data storage device. Additionally, the client application 134 may send the user-identifier and the directory information to the data storage device.

After a particular data storage device is registered or is verified to have previously been registered, the client application 134 may provide updated directory information to the cloud storage system 150 periodically or when there is a change in the content stored in the particular data storage device (while the particular data storage device is coupled to the host device 130). For example, while the host device 130 is coupled to the particular data storage device, the client application may maintain and update a directory and/or directory information stored in the particular data storage device, such as when the content of the data storage device is changed (e.g., added, deleted, modified, etc.). Additionally, the client application 134 may send an update to the cloud storage system 150 to update the directory information stored in the cloud storage system 150. In this way, directory information remotely stored in the cloud storage system 150 may be kept synchronized with directory information locally stored in the data storage device.

The client application 134 may initiate a look-up operation or a search operation at the cloud storage system 150. To initiate a look-up operation, the client application 134 may prompt a user of the host device 130 to input the identifier or the user-identifier of the data storage device to be looked-up. The user may input the identifier or the user-identifier via the user interface 138. For example, the user may input the user-identifier using a key pad or a touch screen of the host device 130. As another example, the user may capture an image of a user-visible code of the data storage device using a camera or other capture device that is part of or coupled to the host device 130. The user-visible code, such as a barcode, a QR code, or a micro-QR code, may correspond to and/or identify the identifier or the user-identifier of the data storage device. The client application 134 may send the identifier or the user-identifier to the network application 152 to look-up an entry based on the identifier or the user-identifier.

When the network application 152 determines that the cloud storage system 150 (e.g., the data structure 154) includes an entry corresponding to the received identifier or user-identifier, the network application 152 may send directory information of the entry to the client application 134. The directory information may be representative of content stored in a corresponding data storage device (at a time when the directory information was created or last updated). The client application 134 may present the directory information received form the cloud storage system 150 via the user interface 138. Accordingly, the user of the host device 130 may determine what content is stored on the looked-up data storage device without having to couple the data storage device to the host device 130.

As another example, the client application 134 may be configured to initiate a search operation at the cloud storage system 150 to identify one or more data storage devices associated with search criteria. To initiate the search operation, the client application 134 may prompt the user of the host device 130 to input search criteria associated with content (e.g., a file). The search criteria may include or correspond to information or data that may be included in one or more entries of the data structure 154. For example, the search criteria may be associated with directory information stored in the cloud storage system 150, such as a file name, a thumbnail, a file description, a file owner, a creation date, a size, and/or comments, as illustrative, non-limiting examples.

Each of the data storage devices 102, 108 may include or be associated with an identifier and a user-identifier. The identifier, such as a media device identifier, may be unique to each data storage device. For example, the identifier may be assigned to the data storage device by a manufacturer of the data storage device. In FIG. 1, the data storage devices 102 and 108 have the identifiers "ID_1" and "ID_2," respectively. The user-identifier (e.g., user-identifiers 121 and 123) may be set (e.g., selected) by a user of the data storage device when the data storage device is introduced to a client application, such as the client application 134, or when the data storage device is registered with the cloud storage system 150. The user-identifier may be an alphanumeric string that is meaningful to the user and that is relatively easy for the user to remember. In FIG. 1, the user-identifier 121 is "Work-01" and the user-identifier 123 is "Home."

Additionally, each of the data storage devices 102, 108 may include a label (e.g., illustrative labels 113 and 115). A label may be a user-visible code included on a particular data storage device (e.g., as a label that is printed on, stuck to, engraved on, or written on a housing of the particular data storage device). The label may include or correspond to the identifier or the user-identifier. For example, when the label corresponds to the identifier, the label may include a QR code, a micro QR code, a bar code, or any other type of two-dimensional or three-dimensional code that is printed on the particular data storage device or applied to the particular data storage device as a sticker. When the label corresponds to the user-identifier, the label may include a written string (of text), a drawing, a symbol, etc., that is written, engraved, or printed onto the particular data storage device or applied to the particular data storage device as a sticker.

The data storage devices 102, 108 may store content, such as data (e.g., one or more files). The data storage devices 102, 108 may also include a directory of the content. For example, the directory may have been created by the host device 130. Additionally or alternatively, the data storage devices 102, 108 may include directory information representative of the directory. In FIG. 1, the data storage devices 102 and 108 store illustrative log files 116 and 118, respectively. When a particular data storage device includes the directory information (e.g., a log file), the directory information may include the user-identifier of the particular data storage device. Alternatively or additionally, the particular data storage device may store the user-identifier separately from the directory information. The directory and/or the directory information may include a corresponding timestamp associated with a time of creating the directory and/or the directory information. Additionally or alternatively, the particular data storage device may include a change log to identify when changes (e.g., additions, deletions, or modifications) were made to one or more files of the particular data storage device.

When a particular data storage device is registered with the cloud storage system 150, updates made to the directory information stored in the particular data storage device may be reflected in directory information stored in the cloud storage system 150. For example, the directory information stored in the cloud storage system 150 may be associated with a first version of a directory of the particular data storage device corresponding to a first point in time. If the directory is updated at a second, subsequent point in time, the first version of the directory information stored in the cloud storage system 150 may be out of date as compared to a second version of the directory information stored in the particular data storage device.

During operation of the system 100, the host device 130 may be configured to be coupled (e.g., physically or wirelessly) to the first data storage device 102. If the first data storage device 102 is unregistered, the host device 130 may receive the message 194 from the cloud storage system 150 indicating that the first data storage device 102 is unregistered. In response to the message 194, the host device 130 may register the first data storage device 102 with the cloud storage system 150 and may send the identifier "ID_1," the user-identifier "Work-01," and a copy of the first log file 116 (or a portion thereof) to the cloud storage system 150 for insertion into the data structure 154. Similarly, if the second data storage device 108 is coupled to the host device 130 and is determined to be unregistered, the host device 130 may register the second data storage device 108 with the cloud storage system 150. Upon deciding on the user-identifiers "Work-01" and "Home," the user may update the labels 113 and 115 accordingly (e.g., by writing "Work-01" and "Home" on the labels 113 and 115, respectively).

Once a data storage device is registered with the cloud storage system 150, the host device 130 may monitor updates made to the data storage device while the data storage device is coupled to the host device 130. The host device 130 may send updates to the cloud storage system 150 when data at the data storage device is modified, so that directory information remotely stored in the cloud storage system 150 matches directory information locally stored in the data storage device (e.g., the cloud storage system 150 may maintain a remote copy of the directory information stored in each of the data storage devices 102, 108). Further, even when the host device 130 is uncoupled from a particular data storage device, the client application 134 may initiate search and look-up operations that identify the particular data storage device as storing content of interest By establishing a user-identifier when a data storage device is registered, a version of directory information of the data storage device that is stored in the cloud storage system may be accessible based on the user-identifier of the data storage device. Additionally, a host device that is not communicatively coupled with the data storage device may access the version of the directory information stored in the cloud storage system based on a label (that includes the user-identifier or an identifier) of the data storage device.

Figure 2:
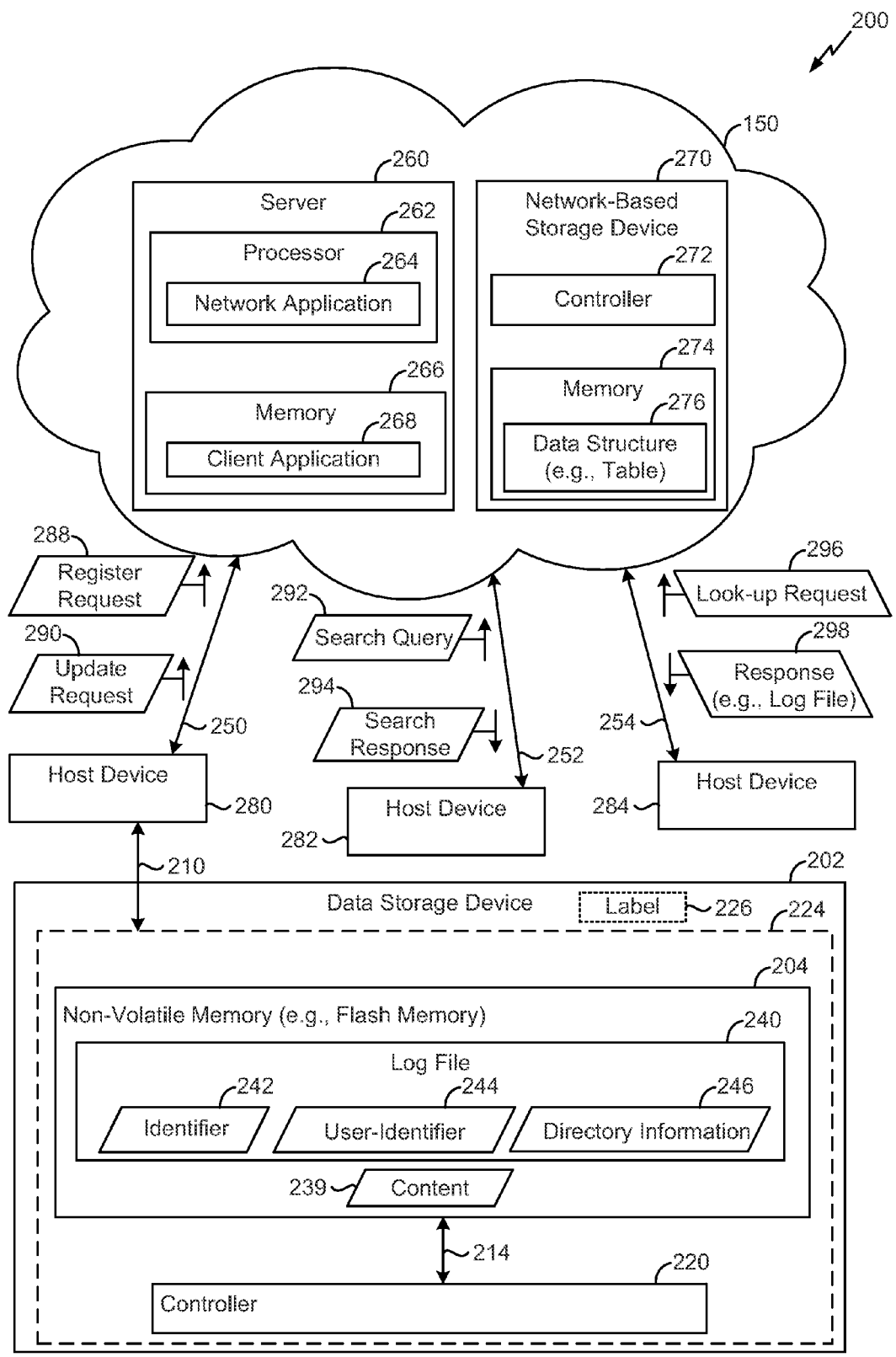
FIG. 2 is a block diagram of a second particular illustrative embodiment of a system including a data storage device, a host device, and a cloud storage system configured to store data associated with content of the data storage device.

FIG. 2 is a block diagram of a particular illustrative embodiment of a system 200 including the cloud storage system 150, host devices 280-284 (e.g., a first host device 280, a second host device 282, and a third host device 284), and a representative data storage device 202. The system 200 may enable storage of and access to data associated with content stored in the one or more data storage devices. For example, components of the system 200 may include or correspond to components of the system 100 of FIG. 1.

In the system 200, the data storage device 202 may be coupled to one of the host devices 280-284 via a communication path, such as a wired communication path and/or a wireless communication path. In FIG. 2, the data storage device 202 is coupled to the first host device 280 via a communication path 210. The data storage device 202 may be embedded within the first host device 280 or may be "removably" coupled to the first host device 280.

Each of the host devices 280-284 may operate in accordance with one or more aspects of the host device 130 of FIG. 1. Each of the host devices 280-284 may include or correspond to a mobile telephone, a music player, a video player, a gaming console, an electronic book reader, a personal digital assistant (PDA), a computer, such as a laptop computer, a notebook computer, or a tablet, any other electronic device, or any combination thereof. Each of the host devices 280-284 may be coupled to the cloud storage system 150 via a network, such as a wireless network, a wired network, or a combination thereof. For example, the first host device 280 may be coupled to the cloud storage system 150 via a first communication path 250 (that is representative of a first network), the second host device 282 may be coupled to the cloud storage system 150 via a second communication path 252 (that is representative of a second network), and the third host device 284 may be coupled to the cloud storage system 150 via the communication path 254 (that is representative of a third network).

The cloud storage system 150 may be configured to maintain a record (e.g., a database) of data storage devices, including the data storage device 202. The cloud storage system 150 may include a server 260 and a network-based storage device 270. Although the cloud storage system 150 is illustrated as including a single server 260 and a single network-based storage device 270, the cloud storage system 150 may include one or more servers, one or more network-based storage devices, or a combination thereof.

The server 260 includes a processor 262 and a memory 266. The processor 262 may include a network application 264 (e.g., software executed by the processor 262), such as the network application 152 of FIG. 1. The network application 264 may be implemented by hardware, software, and/or firmware, or a combination thereof. When the network application 264 includes the software and/or the firmware, the network application 264 may be stored in a memory, such as the memory 266.

The network application 264 may be configured to support the server 260 communicating with the network-based storage device 270 and/or the host devices 280-284. For example, the network application 264 may issue one or more commands to the network-based storage device 270, such as one or more requests to read data from or write data to a memory of the network based storage device 270. Additionally, the network application 264 may communicate data and/or instructions to each of the host devices 280-284, as described further herein.

The memory 266 may be configured to store data and/or instructions that may be executable by the processor 262. Although the memory 266 is illustrated as a single memory, the memory 266 may include one or more memories, such as one or more non-volatile memories, one or more volatile memories, or a combination thereof. The memory 266 may include a client application 268, such as the client application 134 of FIG. 1. The client application 268 may be provided to (e.g., downloaded by) a particular host device to enable the particular host device to communicate with the cloud storage system 150. For example, the client application 268 may be provided to one or more of the host devices 280-284.

The network-based storage device 270 may include a controller 272 and a memory 274. The controller 272 may be coupled to the memory 274 and may be configured to control access to the memory 274. For example, the controller 272 may be configured to receive data and instructions from the server 260. The controller 272 may be further configured to send data and commands to the memory 274 to receive data from the memory 274.

The memory 274 may include a non-volatile memory, such as a flash memory (e.g., a NAND flash memory or a NOR flash memory). In other implementations, the memory 274 may include an erasable programmable read-only memory (EPROM), an electrically-erasable programmable read-only memory (EEPROM), a read-only memory (ROM), a one-time programmable memory (OTP), a resistive random-access memory (ReRAM) another type of memory, or a combination thereof. The memory may include a data structure 276, such as the data structure 154 of FIG. 1.

The data storage device 202 may be representative of one or more data storage devices. For example, the data storage device 202 may be representative of the first data storage device 102 and the second data storage device 108 of FIG. 1. The data storage device 202 may be configured to communicate with a particular host device, such as the first host device 280, to which the data storage device 202 is coupled. The data storage device 202 may receive data from the particular host device, via a controller 220, for storage in a non-volatile memory 204. The controller 220 is further configured to send data and commands to the non-volatile memory 204 and to receive data from the non-volatile memory 204 via a bus 214.

The controller 220 may be coupled to the non-volatile memory 204 via a bus 214, an interface, another structure, or a combination thereof. The non-volatile memory 204 may include a flash memory (e.g., a NAND flash memory or a NOR flash memory). In other implementations, the non-volatile memory 204 may include an erasable programmable read-only memory (EPROM), an electrically-erasable programmable read-only memory (EEPROM), a read-only memory (ROM), a one-time programmable memory (OTP), a resistive random-access memory (ReRAM) another type of memory, or a combination thereof.

The non-volatile memory 204 may include content 239 and a log file 240. The content 239 may include or correspond to data, such as one or more files, stored in the non-volatile memory 204. The log file 240 may include an identifier 242 of the data storage device 202, a user-identifier 244 of the data storage device, and directory information 246 that is representative of the content 239 stored in the data storage device 202. Although the log file 240 is illustrated as including the identifier 242 and the user-identifier 244, one or more of the identifier 242 or the user-identifier 244 may be stored in the non-volatile memory 204 and may not be included in the log file 240. The log file 240 may be representative of the first log file 116 and the second log file 118 of FIG. 1.

The data storage device 202 may include a housing 224. The non-volatile memory 204 and the controller 222 may be located inside the housing 224, and a label 226 may be external to the housing 224 or attached to an exterior surface of the housing 224. The label 226 may include or correspond to the identifier 242 and/or the user-identifier 244. For example, the label 226 may include a QR code, a micro QR code, a bar code, another two-dimensional code, a three-dimensional code, a string (of text), a drawing, or a symbol, as illustrative, non-limiting examples. The label 226 may be written, engraved, or printed onto the housing 224 or applied to the housing 224, such as a sticker.

During operation of the system 200, the server 260 may receive a registration request 288 including registration information from the first host device 280. The registration request 288 may be associated with registering the data storage device 202 with the cloud storage system 150. The registration information may include the log file 240 (e.g., the identifier 242, the user-identifier 244, and/or the directory information 246). Based on the registration request 288, the server 260 may initiate (e.g., send an instruction to) the network-based storage device 270 to generate an entry in the data structure 276 that corresponds to the data storage device 202. The entry may include the registration information.

After the data storage device 202 is registered with the cloud storage system 150, the server 260 may receive an update request 290. The update request 290 may include update information associated with an update to be applied to the entry of the data structure 276 that corresponds to the data storage device 202. For example, the update request 290 may cause the server 260 to instruct the network-based storage device 270 to update directory information (associated with the data storage device 202) that is stored in the data structure 276.

The server 260 may also receive a search request 292, such as a file search request, including search criteria. In FIG. 2, the search request 292 is sent by the second host device 282 while the second host device 282 is not coupled to the data storage device 202. The search criteria may include or correspond to information or data that may be included in the entry (corresponding to the data storage device 202), such as a file name, a thumbnail, a file description, a file owner, a creation date, a size, and/or comments, as illustrative, non-limiting examples. Based on the search request 292, the server 260 may initiate (e.g., send an instruction to) the network-based storage device 270 to perform a search operation on the data structure 276 to identify one or more entries of the data structure 276 that satisfy the search criteria. If the network-based storage device 270 identifies one or more entries based on the search operation, the network-based storage device 270 may provide entry information (e.g., an identifier, a user-identifier, and/or directory information) for each of the one or more entries. If the network-based storage device 270 cannot locate an entry based on the search operation, the network-based storage device 270 may indicate to the server 260 that no entry matches the search criteria. The server 260 may send the second host device 282 a search response 294 based on a result of the search operation performed by the network based storage device 270.

The server 260 may further receive a look-up request 296 that includes look-up information. In FIG. 2, the look-up request 296 is sent by the third host device 284 while the third host device 284 is not coupled to the data storage device 202. The look-up information may be based on a label 226 (e.g., a user-visible code) of the data storage device 202. The label may be associated with the identifier 242 and/or the user-identifier 244 and the look-up information may include a value of the identifier 242 and/or a value of the user-identifier 244. For example, a user of the third host device 284 may determine a value of the user-identifier based on the label 226. Based on the look-up request 296, the server 260 may initiate (e.g., send an instruction to) the network-based storage device 270 to perform a look-up operation of an entry based on the look-up information and to return directory information corresponding to the entry. If the network-based storage device 270 cannot locate a particular entry based on the look-up information, the network-based storage device 270 may indicate to the server 260 that no entry matches the look-up information. The server 260 may send the third host device 284 a look-up response 298 based on the look-up operation performed by the network based storage device 270. Accordingly, the label (e.g., the identifier and/or the user-identifier) may be used for a "fast" retrieval of the directory information from the cloud storage system 150 (without having to couple the data storage device to a host device) as compared to "slow" retrieval where the data storage device is coupled to a host device to determine the contents of the data storage device, which may take several minutes.

By establishing and maintaining the data structure 276 including an identifier and a user-identifier associated with each data storage device registered with the cloud storage system 150, the cloud storage system 150 may be able to provide directory information (of a particular data storage device or multiple storage devices) to a host device regardless of whether the host device is coupled to the particular data storage device.

Figure 3:
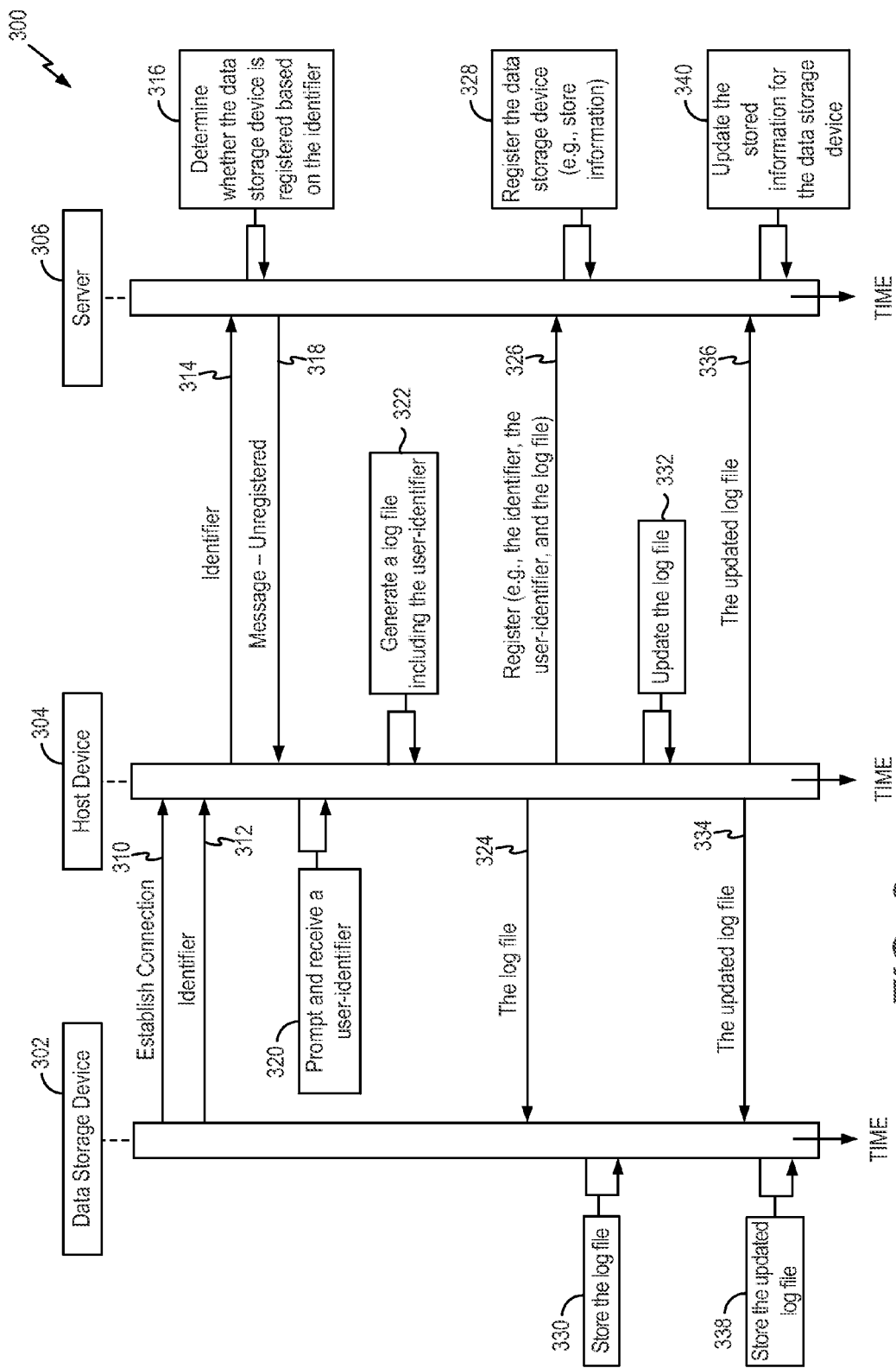
FIG. 3 is a ladder diagram to illustrate an illustrative method of storing a log file at a data storage device.

Referring to FIG. 3, a first illustrative embodiment of a method 300 of communicating between a representative data storage device 302, a representative host device 304, and a representative server 306 is shown. The method 300 is illustrated by a ladder diagram. The method 300 may be used to store a log file at the data storage device 302 and to register the data storage device 302 with the server 306. For example, the data storage device 302 may include or correspond to the first data storage device 102 or the second data storage device 108 of FIG. 1, or the data storage device 202 of FIG. 2. As another example, the host device 304 may include or correspond to the host device 130 of FIG. 1 or to one of the host devices 280-284 of FIG. 2.

The data storage device 302 may establish a connection with the host device 304, at 310. The connection may be a wired connection or a wireless connection. The data storage device 302 may send an identifier to the host device 304, at 312. To illustrate, the host device 304 may detect the data storage device 302 (e.g., when a user inserts the data storage device 302 into a slot, such as an interface, of the host device 304) and may request the identifier from the data storage device 302.

In response to receiving the identifier from the data storage device 302, the host device 304 may communicate the identifier to the server 306, at 314. The server 306 may include or correspond to the network application 152 or the server 260 of FIG. 2. The server 306 may be included in or correspond to a cloud storage service, such as the cloud storage system 150 of FIG. 1. In a particular embodiment, prior to sending the identifier to the server 306, the host device 304 may establish a communication session with the server 306. For example, the communication session may be associated with a user account maintained at the server 306.

The server 306 may determine whether the data storage device 302 is registered based on the identifier, at 316. If the server 306 determines that the data storage device 302 is not registered, the server 306 may send a message to the host device 304 indicating that the data storage device 302 is unregistered, at 318. Alternatively, if the server 306 determines that the data storage device 302 is registered, the server 306 may send an indication, such as a message, that the data storage device 302 is registered.

Based on the message indicating that the data storage device 302 is unregistered, the host device 304 may register the data storage device 302 with the server 306. To register the data storage device 302, the host device 304 may prompt a user for a user-identifier and may receive an input corresponding to the user-identifier, at 320. The user-identifier (e.g., a user-identifiable designation) of the data storage device 302 may be known to the user of the data storage device 302, such as when the user-identifier is written on a housing of the data storage device 302 and is visible to the user. For example, the user-identifier may include the user-identifier 121 or the user-identifier 123 of FIG. 1 or the user-identifier 244 of FIG. 2. To register the data storage device 302, the host device 304 may also generate a log file (of the data storage device 302) that includes the user-identifier, at 322. The log file may include or correspond to directory information that is representative of content stored in the data storage device 302. The host device 304 may register the data storage device 302 with the server 306, at 326. Registering the data storage device 302 may include providing the server 306 with the identifier, the user-identifier, and the log file (e.g., the directory information) of the data storage device 302.

The server 306 may register the data storage device 302, at 328. To register the data storage device 302, the server 306 may generate an entry corresponding to the data storage device 302 to be stored in a network-based storage device, such as the network-based storage device 270 of FIG. 2.

After the log file is generated by the host device 304, at 322, the host device 304 may send the log file (e.g., the directory information) to the data storage device 302, at 324. The data storage device 302 may receive and store the log file, at 330. The data storage device 302 may store the log file in a memory, such as a non-volatile memory, of the data storage device 302. The memory of the data storage device 302 may correspond to the non-volatile memory 204 of the data storage device 202 of FIG. 2.

The host device 304 may update the log file, at 332. For example, the host device 304 may generate an updated version of the log file. In response to updating the log file, the host device 304 may send the updated log file (e.g., an updated version of the log file) to the data storage device 302, at 334, and the data storage device 302 may store the updated log file, at 338. In addition to sending the updated log file to the data storage device 302, the host device 304 may send the updated log file to the server 306, at 336. The server 306 may update the stored information maintained for the data storage device 302 based on the updated log file, at 340. For example, the server 306 may update the entry that corresponds to the data storage device 302 based on the updated log file.

The method 300 provides a method of storing a log file (e.g., directory information) based on the content stored in the data storage device 302. The log file may be stored in the data storage device 302 and may be associated with a user-identifier of the data storage device 302. Additionally, the server 306 may store a copy of the log file in the cloud storage service. By storing the copy of the log file at the cloud storage service, the log file (e.g., the copy) may be available to the host device 304 when the host device 304 is not coupled to the data storage device 302. Accordingly, the host device 304 may be able to "quickly" retrieve the log file from the server 306 (without having to couple the data storage device 302 to a host device 304) as compared to "slowly" retrieving the log file from the data storage device 302 by coupling the data storage device 302 to the host device 304. Additionally, by storing the copy of the log file at the cloud storage service, a host device (other than the host device 304) that is not configured to physically couple with the data storage device 302 (e.g., a host device the does not have an interface configured to couple to the data storage device 302) may be able to receive the log file from the server 306.

Figure 4:
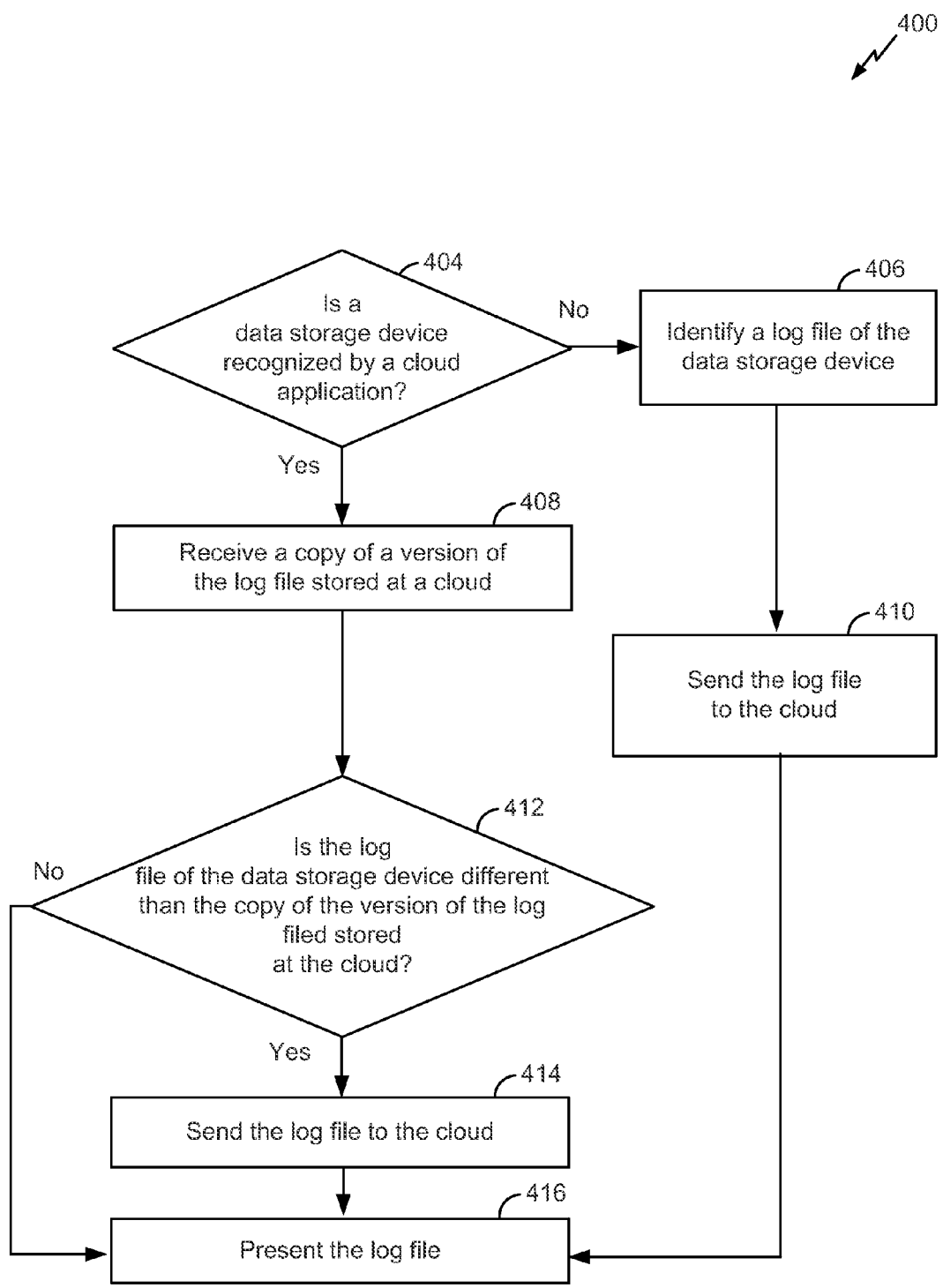
FIG. 4 is a flow diagram of a first illustrative method of operating a host device.

FIG. 4 illustrates a particular embodiment of a method 400 that may be performed at a host device, such as the host device 130 of FIG. 1, any of the host devices 280-284 of FIG. 2, or the host device 304 of FIG. 3. For example, the method 400 may be performed by the processor 132 (e.g., the client application 134) of the host device 130 of FIG. 1.

The method 400 may include determining whether a data storage device is recognized by a cloud application, at 404. The cloud application may be associated with a cloud storage service, such as the cloud storage system 150 of FIG. 1. The host device may determine if the cloud application recognizes the data storage device responsive to detecting that the data storage device is communicatively coupled to the host device. The host device may determine whether the cloud application recognizes the data storage device based on a message received at the host device from the cloud storage system. For example, the data storage device 302 may include or correspond to the first data storage device 102 or the second data storage device 108 of FIG. 1, the data storage device 202 of FIG. 2, or the data storage device 302 of FIG. 3. The cloud application may include or correspond to the network application 152 of FIG. 1, the server 260 and/or the processor 262 (e.g., the network application 264) of FIG. 2, or the server 306 of FIG. 3.

When a determination is made that the cloud application does not recognize the data storage device, the method 400 may include identifying a log file of the data storage device, at 406, and sending the log file the cloud, at 410. For example, the cloud may include or correspond to the cloud storage system 150 of FIG. 1. To identify the log file, the host device may determine whether the data storage device includes a log file. If the data storage device includes the log file, the host device may receive the log file from the data storage device and send a copy of the log file to the cloud. If the data storage device does not include the log file, identifying the log file may include creating (e.g., generating) the log file at the host device. The host device may send the generated log file to the cloud and to the data storage device. After the log file is sent by the host device to the cloud, the method 400 may proceed to 416.

When a determination is made that the cloud application recognizes the data storage device, the method 400 may include receiving a copy of a version of a log file stored in a cloud, at 408. The method 400 may also include determining whether the log file of the data storage device is different than the copy of the version of the log file stored in the cloud, at 412.

When a determination is made that the log file of the data storage device matches the copy of the version of the log file stored in the cloud, the method 400 may proceed to 416. When a determination is made that the log file of the data storage device is different than the copy of the version of the log file stored in the cloud, the method 400 may including sending the log file (generated by the host device) to the cloud, at 414. Sending the log file to the cloud may enable the cloud to update the version of the log file stored in the cloud to match the log file generated by the host device (e.g., the log file generated based on content stored in the data storage device at the time the log file is generated).

The method 400 may further include presenting the log file, at 416. For example, the log file may be presented by the host device using a user interface, such as a display, that is coupled to the host device.

By checking whether the data storage device is recognized by a cloud application, the method 400 enables the host device to verify that a copy of the log file stored at the cloud represents content stored in the data storage device. For example, the host device may provide the copy of the log file to the cloud if the cloud does not already store a matching version of the log file or, if the cloud includes a prior version of the log file, the host device may update the version of the log file. By verifying that the copy of the log file stored at the cloud matches the version of the log file at the data storage device, one or more host devices may be able to access the copy of the log file to determine the content stored in the data storage device even when the one or more host devices are not coupled to the data storage device.

Figure 5:
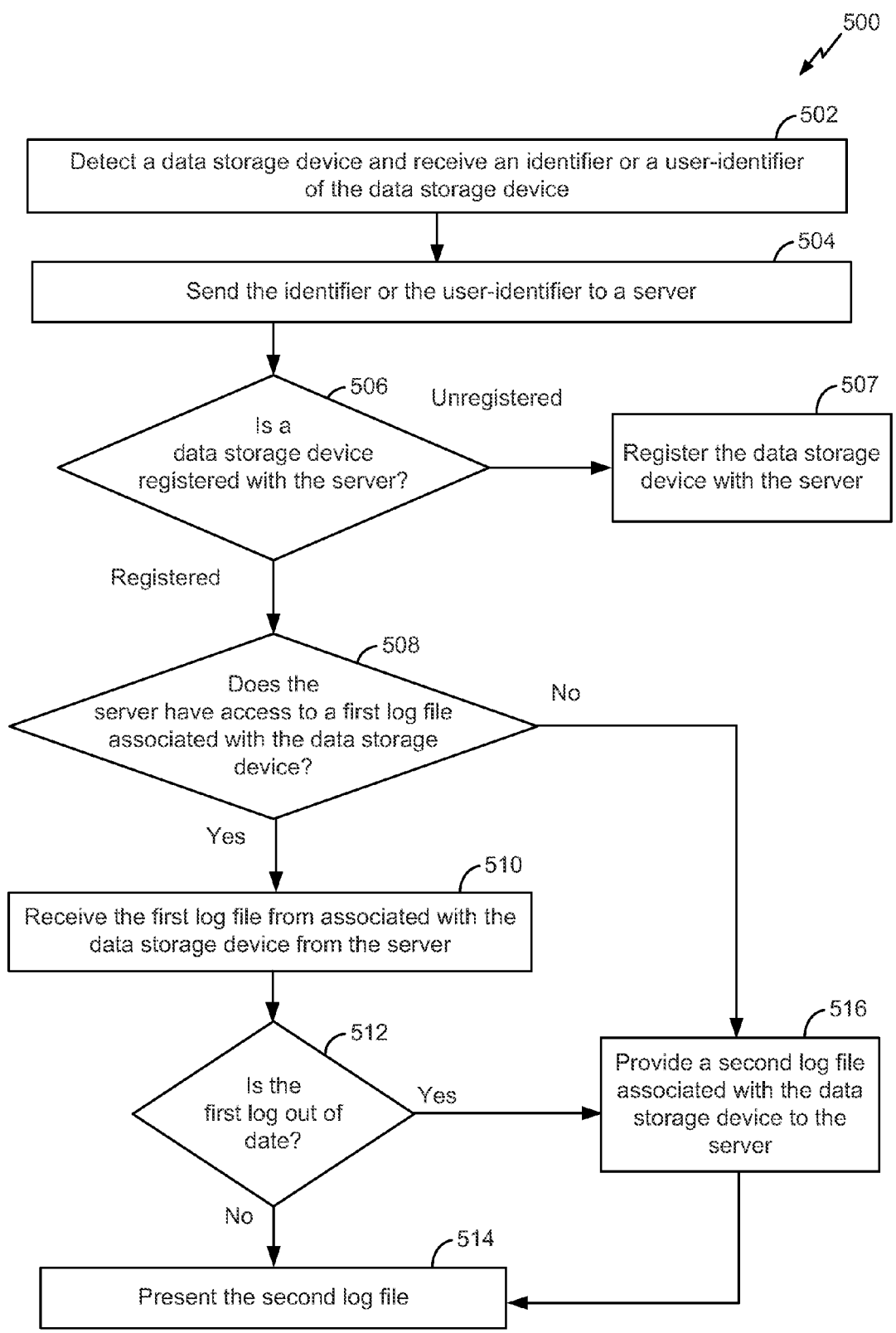
FIG. 5 is a flow diagram of a second illustrative method of operating a host device.

FIG. 5 illustrates a particular embodiment of a method 500 that may be performed at a host device, such as the host device 130 of FIG. 1, the host devices 280-284 of FIG. 2, or the host device 304 of FIG. 3. For example, the method 500 may be performed by the processor 132 (e.g., the client application 134) of FIG. 2.

The method 500 may include detecting a data storage device and receiving an identifier or a user-identifier of the data storage device, at 502. For example, the data storage device may include or correspond to the first data storage device 102 or the second data storage device 108 of FIG. 1, the data storage device 202 of FIG. 2, or the data storage device 302 of FIG. 3. In a particular embodiment, the data storage device may be detected on the basis of electrical signals output by the data storage device or by a detection circuit when the data storage device is inserted into a device interface or slot.

The method 500 may include sending the identifier or the user-identifier to a server, at 504. The server may be included in or correspond to a cloud storage system, such as the cloud storage system 150 of FIG. 1. For example, the server may include or correspond to the server 260 of FIG. 2 or the server 306 of FIG. 3.

The method 500 may include determining whether the data storage device is registered with the server, at 506. For example, the host device may determine whether the data storage device is registered with the server based on a message received from the server. If a determination is made that the data storage device not registered with the sever, the method 500 may include registering the data storage device with the server, at 507.

If a determination is made that the data storage device is registered with the server, the method 500 may include determining whether the server has access to a first log file (e.g., first directory information) associated with the data storage device, at 508. The first log file may be stored in the cloud storage system (e.g., at a network-based storage device, such as the network-based storage device 270 of FIG. 2). If a determination is made that the server does not have access to the first log file (e.g., the network-based storage device does not store a particular log file corresponding to the data storage device), the method 500 may include providing a second log file (e.g., second directory information) associated with the data storage device to the server, at 516. The second log file may be generated by the host device or may be received from the data storage device, and may be associated with content stored in the data storage device at the time the second log file is generated.

If a determination is made that the server has access to the first log file (e.g., the network-based storage device stores a particular log file corresponding to the data storage device), the method 500 may include receiving the first log file associated with the data storage device from the server, at 510. The method 500 may include determining whether the first log file is out of date, at 512. For example, the host device may determine that the first log file is out of date if the first log file and the second log file do not match. If the first log file is out of date, the method 500 may include sending the second log file associated with the data storage device to the server, at 516. Alternatively, rather than sending the second log file, one or more updates may be provided to enable the first log file to be modified to match (e.g., be the same as) the second log file.

If the first log file is not out of date, the method 500 may include presenting the second log file, at 514. For example, the log file may be presented by the host device using a user interface, such as a display, that is coupled to the host device.

By checking whether the data storage device is registered with the server, the method 500 enables the host device to register the data storage device when the data storage device is not registered with the host device. Additionally, when the data storage device is registered, the method 500 enables the host device to determine whether a copy of the log file maintained by the server is up to date and update the copy maintained by the server, if needed.

Figure 6:
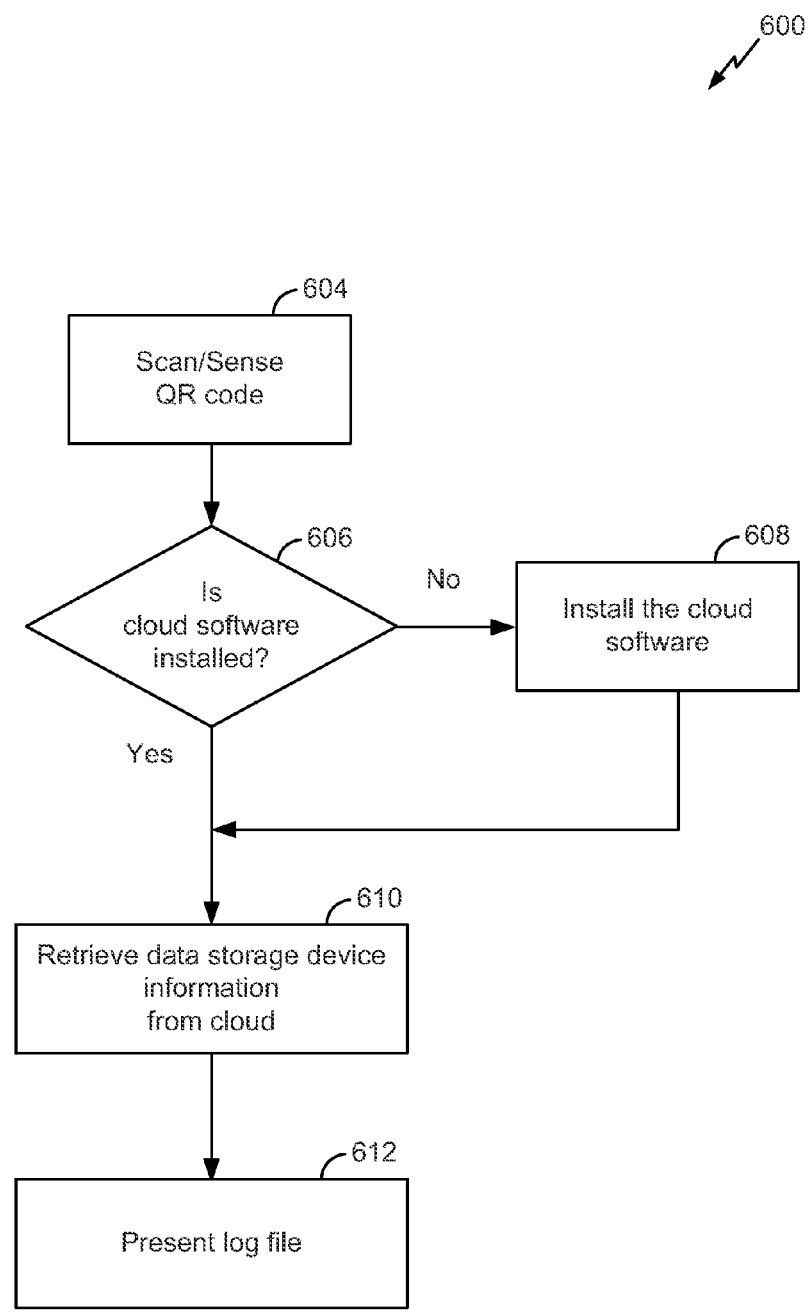
FIG. 6 is a flow diagram of a third illustrative method of operating a host device.

FIG. 6 illustrates a particular embodiment of a method 600 that may be performed at a host device, such as the host device 130 of FIG. 1, the host devices 280-284 of FIG. 2, or the host device 304 of FIG. 3. For example, the method 600 may be performed by the processor 132 (e.g., the client application 134) of FIG. 2.

The method 600 may include scanning or sensing a QR code, at 604. The QR code may include or correspond to an identifier and/or a user-identifier of a data storage device. For example, the data storage device may include or correspond to the first data storage device 102 or the second data storage device 108 of FIG. 1, the data storage device 202 of FIG. 2, or the data storage device 302 of FIG. 3. Alternatively or additionally, the QR code may include a link to a cloud storage system, such as the cloud storage system 150 of FIG. 1. For example, the cloud storage system may include or correspond to a server, such as the server 260 of FIG. 2 or the server 306 of FIG. 3, and the QR code may include a link (e.g., an internet web address) to the server or an instruction to cause the host device to contact the server.

The method 600 may include determining whether cloud software (e.g., a client application, such as the client application 134 of FIG. 1 or the client application 268 of FIG. 2) is installed at the host device, at 606. If a determination is made that the cloud software is not installed at the host device, the method 600 may include installing the cloud software at the host device, at 608. For example, the host device may download the cloud software from a server of the cloud storage system.

If a determination is made that the cloud software is installed at the host device or after installing the cloud software, the method 600 may include retrieving data storage device information from the cloud storage system, at 610. For example, the host device may execute the cloud software to send an image of the QR code (or data determined based on the QR code) to the cloud storage system to enable the cloud storage system to identify the data storage device and to provide data storage device information to the host device. The data storage device information may include a version of a log file (e.g., directory information) associated with the data storage device.

The method 600 may further include presenting the log file, at 612. For example, the log file may be presented by the host device using a user interface, such as a display, that is coupled to the host device.

By installing the cloud software at the host device, the method 600 enables the host device to receive the data storage device information from the cloud based on the QR code of the data storage device. Accordingly, the host device does not have to be coupled to the data storage device to receive the data storage device information associated with the data storage device.

Figure 7:
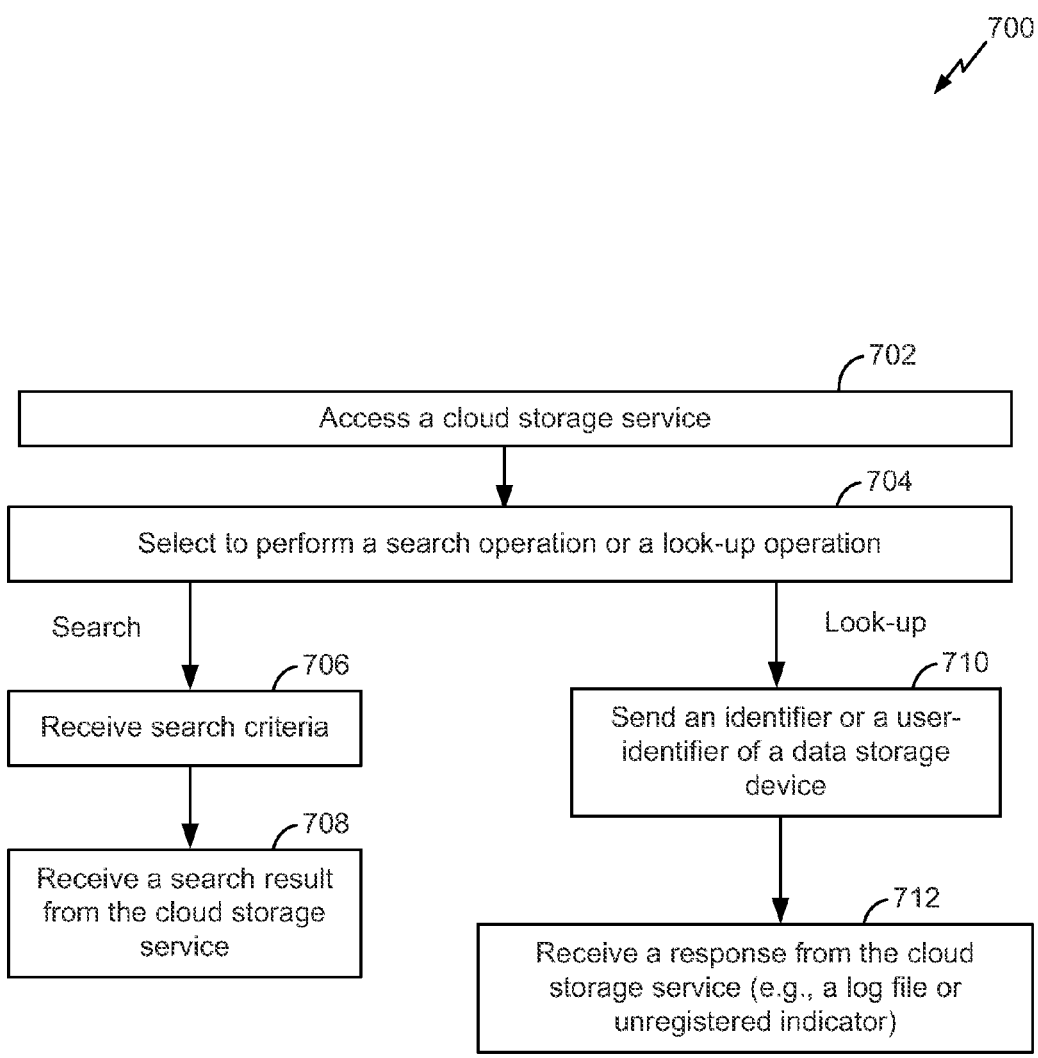
FIG. 7 is a flow diagram of a fourth illustrative method of operating a host device.

FIG. 7 illustrates a particular embodiment of a method 700 that may be performed at a host device, such as the host device 130 of FIG. 1, the host devices 280-284 of FIG. 2, or the host device 304 of FIG. 3. For example, the method 700 may be performed by the processor 132 (e.g., the client application 134) of FIG. 2. The method 600 may begin, at 602.

The method 700 may include accessing a cloud storage service, at 702. For example, the cloud storage service may include or correspond to the cloud storage system 150 of FIG. 1. The host device may access the cloud storage service using a client application, such as the client application 134 of FIG. 1 or the client application 264 of FIG. 2). The client application may be launched at the host device in response to a user input received at the host device, such as a user selecting an icon presented on a display of the host device. When the cloud storage device is accessed, the host device may have to provide log-in information to the cloud storage service to access a user account of a social network supported by or associated with the cloud storage service.

The method 700 may further include selecting to perform a search operation or a look-up operation, at 704. When the search operation is selected, the method 700 may include receiving search criteria, at 706. The host device may send a search request including the search criteria to the cloud storage service.

The method 700 may include receiving a search result from the cloud storage service, at 708. The search result may identify a particular data storage device that satisfies the search criteria (e.g., stores a file that satisfies the search criteria). The particular data storage device may be registered with the cloud storage service. In a particular embodiment, the particular data storage device corresponds to the user account that was logged into when the host device accessed the cloud storage service.

When the look-up operation is selected, the method 700 may include sending an identifier or a user-identifier of a data storage device, at 710. For example, the host device may receive a user input associated with the identifier or the user-identifier.

The method 700 may further include receiving a response from the cloud storage service, at 712. When the data storage device is registered, the response may include information associated with the data storage device, such as an identifier, a user-identifier, and/or directory information (e.g., a log file), as illustrative, non-limiting examples. When the data storage device is not registered with the cloud storage service, the response may include a message indicating that the data storage device is unregistered. When the data storage device is not registered with the user account that the host device is logged into, the response may include a message indicating that the data storage device is not registered and/or that the host device is not authorized to access information associated with the data storage device.

By selecting the server to perform the search operation or the look-up operation, the method 700 enables the host device to search or receive information about one or more data storage devices without having to be coupled to any of the one or more data storage devices.

Figure 8:
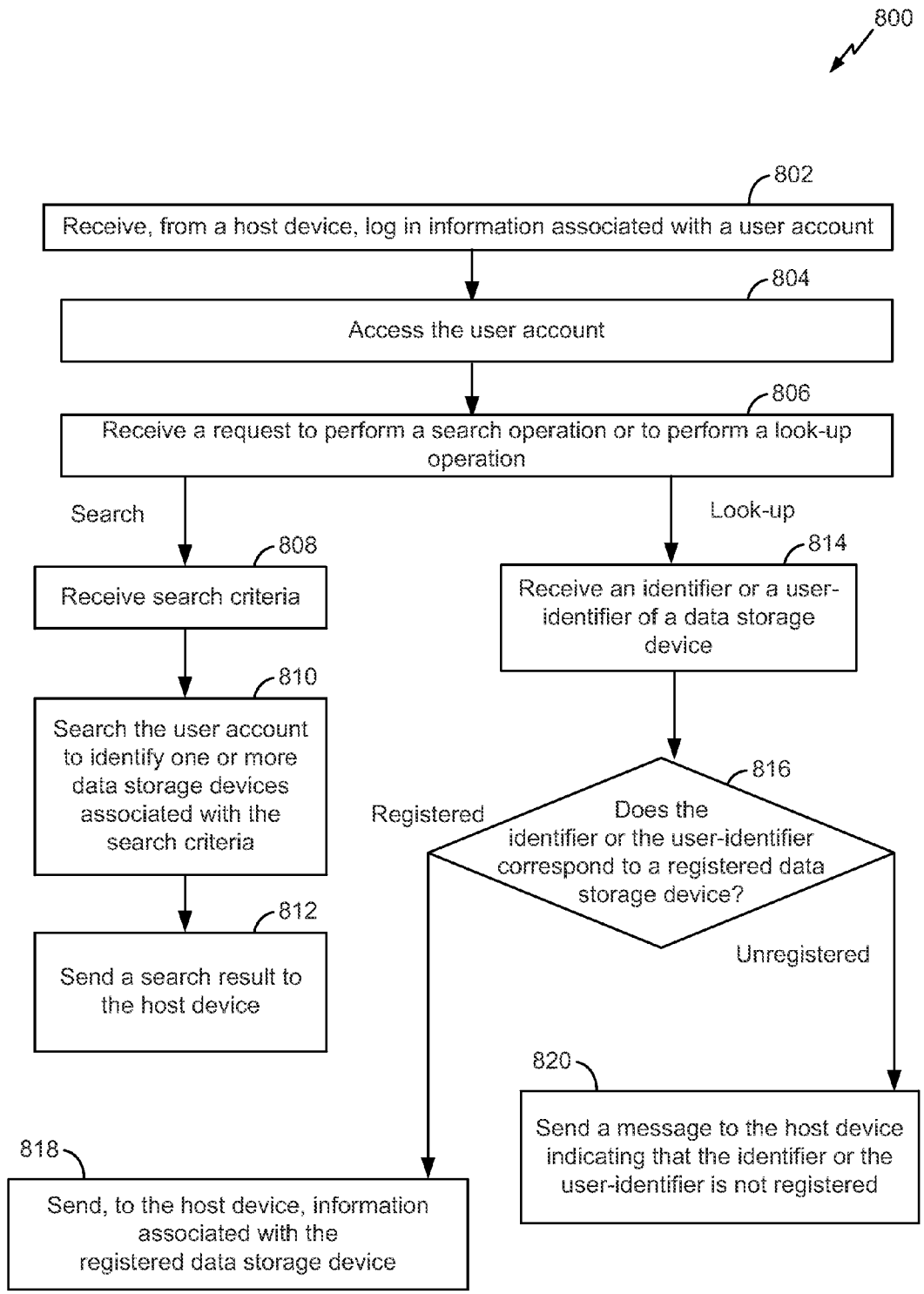
FIG. 8 is a flow diagram of a first illustrative method of operating a server.

FIG. 8 illustrates a particular embodiment of a method 800 that may be performed at a server, such as the server 260 of FIG. 2 or the server 306 of FIG. 3. For example, the method 800 may be performed by the processor 262 (e.g., the network application 264) of FIG. 2. The server may be included in or correspond to a cloud storage system, such as the cloud storage system 150 of FIG. 1.

The method 800 may include receiving, from a host device, log in information associated with a user account, at 802. For example, the host device may include or correspond to the host device 130 of FIG. 1, the host devices 280-284 of FIG. 2, or the host device 304 of FIG. 3.

The method 800 may further include accessing the user account (based on the log in information), at 804. The method 800 may include receiving a request to perform a search operation or to perform a look-up operation, at 806. When the request is to perform the search operation, the method 800 may include receiving search criteria, at 808. The method 800 may include searching the user account to identify one or more data storage devices associated with the search criteria, at 810. The method 800 may further include sending a search result to the host device, at 812.

When the request is to perform the look-up operation, the method 800 may include receiving an identifier or a user-identifier of a data storage device, at 814. For example, the data storage device may include or correspond to the first data storage device 102 or the second data storage device 108 of FIG. 1, the data storage device 202 of FIG. 2, or the data storage device 302 of FIG. 3.

The method 800 may include determining whether the identifier or the user-identifier corresponds to a registered data storage device (e.g., a data storage device registered with the cloud storage system and/or registered with the user account), at 816. When the identifier or the user-identifier correspond the registered data storage device, the method 800 may include sending, to the host device, information associated with the registered data storage device, at 818.

When the identifier or the user-identifier do no correspond the registered data storage device, the method 800 may include sending a message to the host device indicating that the identifier or the user-identifier is not registered, at 820. For example, the message may indicate whether the identifier or the user-identifier is not registered with the cloud storage system, is not registered with the user account, that the host device is not authorized to access information associated with the identifier or the user-identifier, or a combination thereof.

By accessing the user account, the method 800 enables the server to perform search operations and look-up operations on a set of one or more data storage devices associated with the user account. Accordingly, a user (via a host device) associated with the user account may have access to information, such as directory information associated with the set of one or more data storage devices, even when the host device is not coupled to any storage device of the set of storage devices. Additionally, information associated with the set of one or more data storage devices may be protected (e.g., secured) from other users that do not have the log in information corresponding to the user account.

Figure 9:
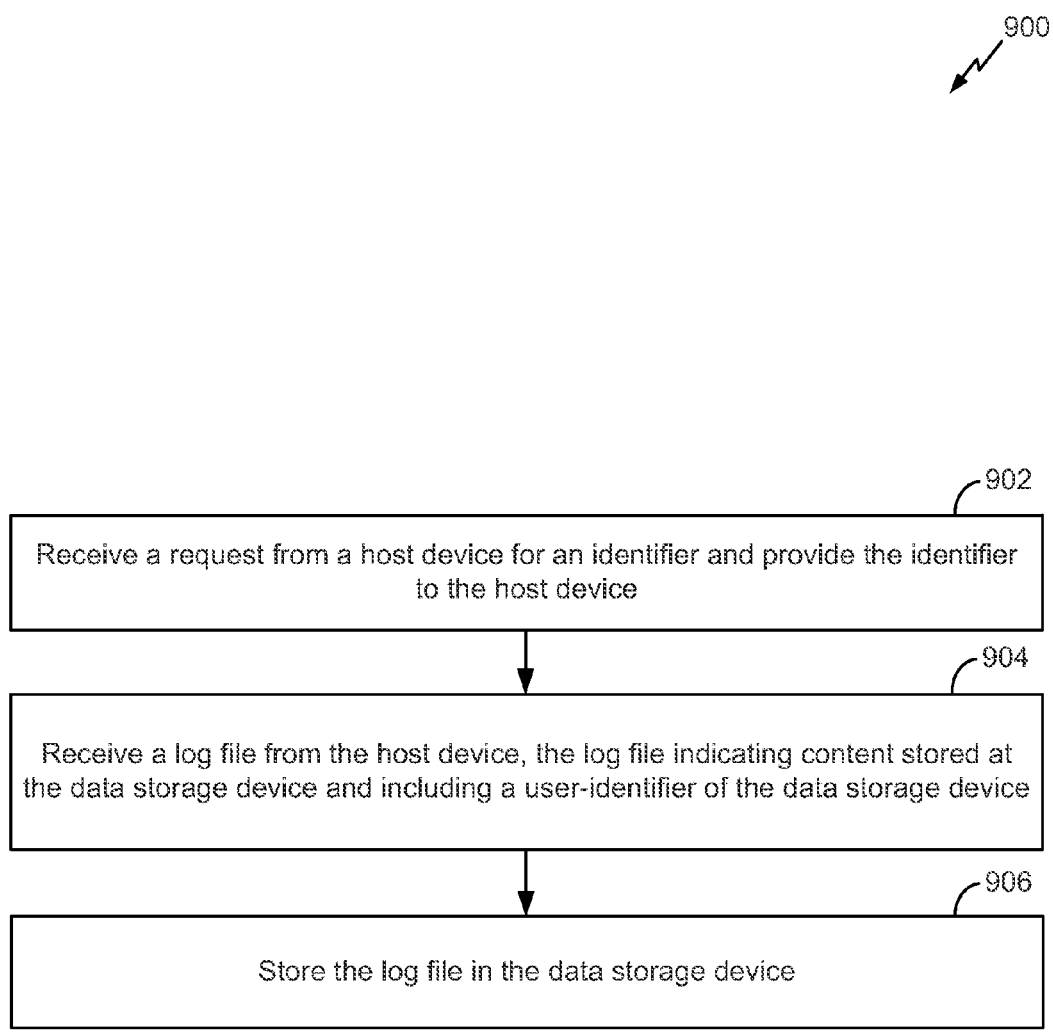
FIG. 9 is a flow diagram of a first illustrative method of operating a data storage device.

FIG. 9 illustrates a particular embodiment of a method 900 that may be performed at a data storage device, such as the first data storage device 102 or the second data storage device 108 of FIG. 1, the data storage device 202 of FIG. 2, or the data storage device 302 of FIG. 3. For example, the method 900 may be performed by the controller 220 of FIG. 2.

The method 900 includes receiving a request from a host device for an identifier and providing the identifier to the host device, at 902. For example, the host device may include the host device 130 of FIG. 1, the host devices 280-284 of FIG. 2, or the host device 304 of FIG. 3.

The method 900 also includes receiving a log file from the host device, the log file indicating content stored in the data storage device and including a user-identifier of the data storage device, at 904. For example, the log file may include the first log file 116 or the second log file 118 of FIG. 1, or the log file 240 of FIG. 2. The method 900 further includes storing the log file in the data storage device, at 906.

The method 900 provides a method of storing a log file (e.g., directory information) based on the content stored in the data storage device. The log file may be stored in the data storage device and may be associated with a user-identifier of the data storage device.

Figure 10:
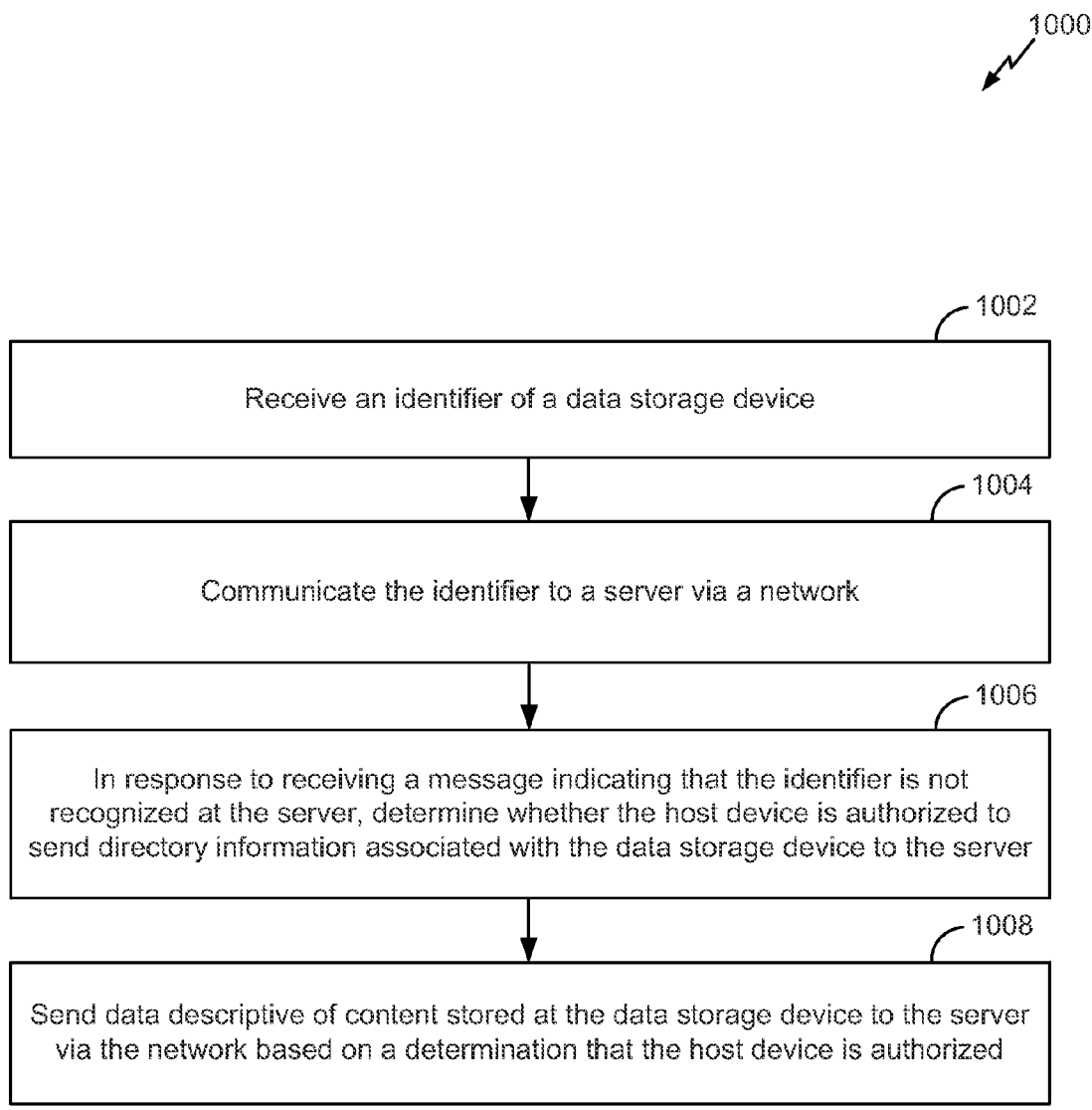
FIG. 10 is a flow diagram of a fifth illustrative method of operating a host device.

FIG. 10 illustrates a particular embodiment of a method 1000 that may be performed at a host device, such as the host device 130 of FIG. 1, the host devices 280-284 of FIG. 2, or the host device 304 of FIG. 3. For example, the method 1000 may be performed by the processor 132 (e.g., the client application 134) of FIG. 2.

The method 1000 includes receiving an identifier of a data storage device, at 1002. For example, the data storage device may include the first data storage device 102 or the second data storage device 108 of FIG. 1, the data storage device 202 of FIG. 2, or the data storage device 302 of FIG. 3.

The method 1000 also includes communicating the identifier to a server via a network, at 1004. For example, the server may include or correspond to network application 152 of FIG. 1, the server 260 (e.g., the processors 262 and/or the network application 264) of FIG. 2, or the server 306 of FIG. 3.

The method 1000 further includes, in response to receiving a message indicating that the identifier is not recognized by the server, determining whether the host device is authorized to send directory information associated with the data storage device to the server, at 1006. For example, the message may include the message 194 of FIG. 1. To determine whether the host device is authorized, the host device may prompt a user of the host device for permission (e.g., authorization) via a user interface of the host device, such as the user interface 138 of FIG. 1.

The method 1000 further includes sending data descriptive of content stored in the data storage device to the server via the network based on a determination that the host device is authorized, at 1008. For example, the data may be included in a register request sent to the server, such as the register request 288 of FIG. 2.

By determining whether the data storage device is recognized by the server, the method 1000 enables the host device to verify that the server includes the data descriptive of the content stored in the data storage device.

Figure 11:
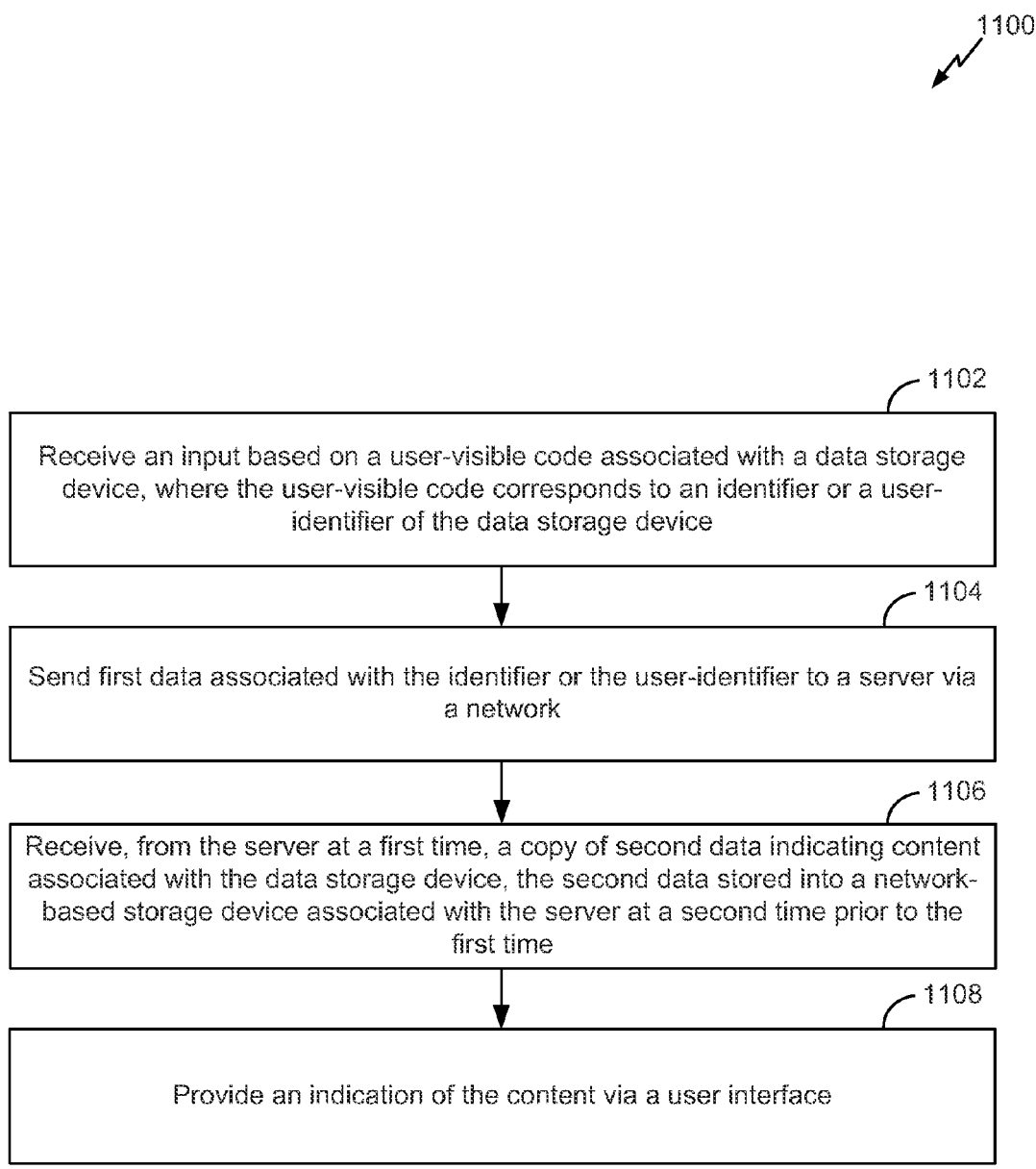
FIG. 11 is a flow diagram of a sixth illustrative method of operating a host device.

FIG. 11 illustrates a particular embodiment of a method 1100 that may be performed at a host device, such as the host device 130 of FIG. 1, the host devices 280-284 of FIG. 2, or the host device 304 of FIG. 3. For example, the method 1100 may be performed by the processor 132 (e.g., the client application 134) of FIG. 2.

The method 1100 includes receiving an input based on a user-visible code associated with a data storage device, where the user-visible code corresponds to an identifier or a user-identifier of the data storage device, at 1102. For example, the data storage device may include the first data storage device 102 or the second data storage device 108 of FIG. 1, the data storage device 202 of FIG. 2, or the data storage device 302 of FIG. 3. The user-visible code may include or correspond to the first label 113 or the second label 115 of FIG. 1, or the label 228 of FIG. 2. The input may be received via a user input of the host device, such as the user input 138 of FIG. 1.

The method 1100 also includes sending first data associated with the user-identifier to a server via a network, at 1104. For example, the first data may be included in a look-up request, such as the look-up request 296 of FIG. 2, or a search query, such the search query 292 of FIG. 2. The server may include or correspond to the network application 152 of FIG. 1, the server 260 (e.g., the processors 262 and/or the network application 264) of FIG. 2, or the server 306 of FIG. 3. The server may be associated with a cloud storage service, such as the cloud storage system 150 of FIG. 1.

The method 1100 further includes receiving, from the server at a first time, a copy of second data indicating content associated with the user-identifier, the second data stored into a storage device associated with the server at a second time prior to the first time, at 1106. The method 1100 further includes providing an indication of the content via a user interface at 1108. The user interface may include or correspond to the user interface 138 of the host device 130 of FIG. 1.

By providing the first data associated with the identifier or the user-identifier, the method 1100 enables the host device to receive the copy of the second data indicating content associated with (e.g., stored in) the data storage device, regardless of whether the host device is coupled to the data storage device.

Figure 12:
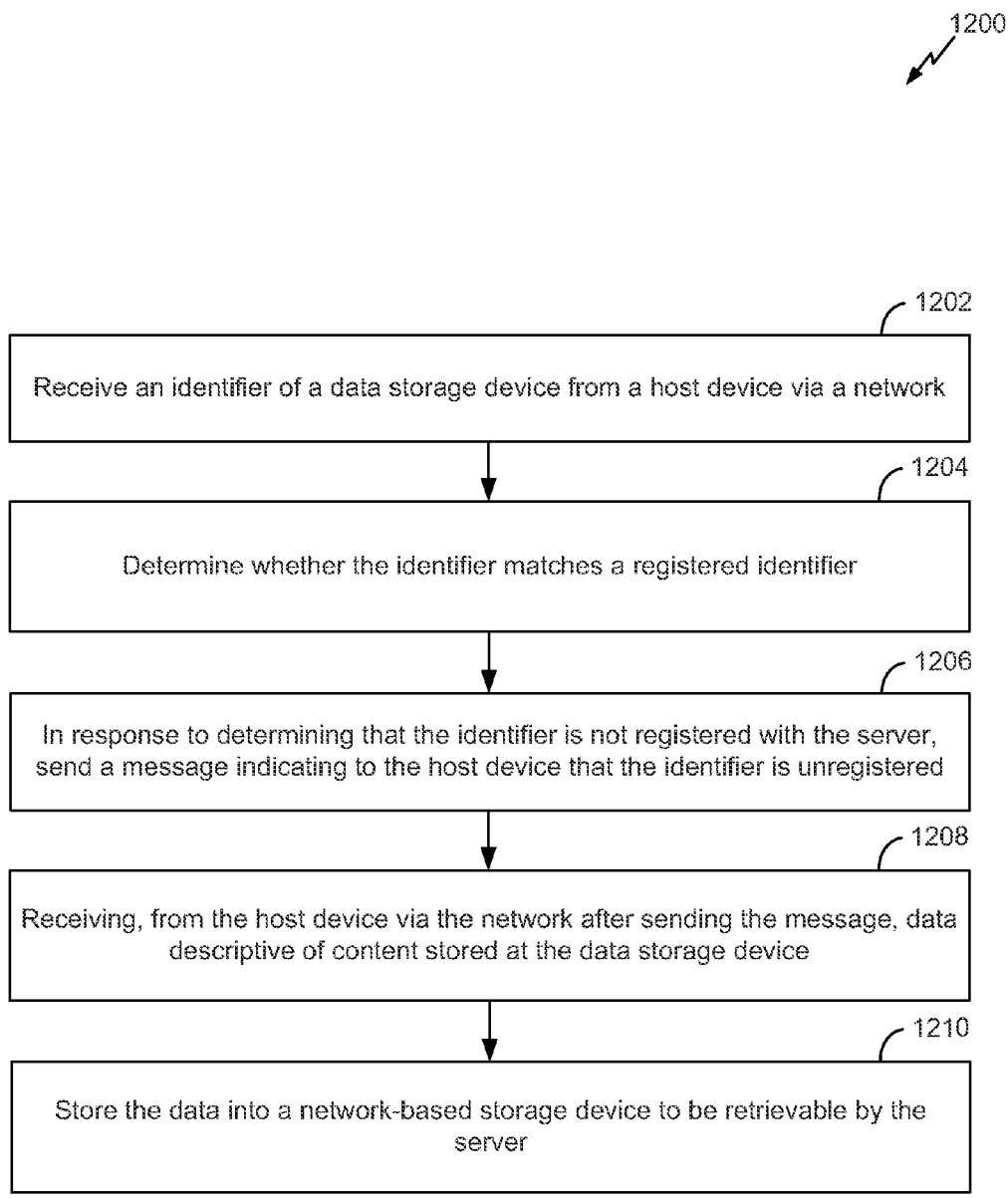
FIG. 12 is a flow diagram of a second illustrative method of operating a server.

FIG. 12 illustrates a particular embodiment of a method 1200 that may be performed at a server, such as the server 260 of FIG. 2 or the server 306 of FIG. 3. For example, the method 1200 may be performed by the processor 262 (e.g., the network application 264) of FIG. 2.

The method 1200 includes receiving an identifier of a data storage device from a first host device via a network, at 1202. For example, the data storage device may include the first data storage device 102 or the second data storage device 108 of FIG. 1, the data storage device 202 of FIG. 2, or the data storage device 302 of FIG. 3. The first host device may include the host device 130 of FIG. 1, the host devices 280-284 of FIG. 2, or the host device 304 of FIG. 3.

The method 1200 also includes determining whether the identifier matches a registered identifier, at 1204. The server may determine whether the identifier matches a particular registered identifier based on a data structure stored in a cloud storage service, such as the cloud storage system 150 of FIG. 1.

The method 1200 further includes, in response to determining that the identifier is not registered with the server, sending a message indicating to the first host device that the identifier is unregistered, at 1206. For example, the message may include the message 194 of FIG. 1.

The method 1200 further includes receiving, from the first host device via the network after sending the message, data descriptive of content stored in the data storage device, at 1208. The data descriptive of the content stored in the data storage device may be included in or associated with a register request, such as the register request 288, received from the host device.

The method 1200 further includes storing the data into a network-based storage device to be retrievable by the server, at 1210. The network-based storage device, such as the network-based storage device 270 of FIG. 2, may store the data into the data structure, such as the data structure 154 of FIG. 1 or the data structure 276 of FIG. 2.

By storing the data (associated with the data storage device) into the network-based storage device, the method 1200 enables the server to provide the data to one or more host devices regardless of whether the one or more host devices are coupled to the data storage device.

Each of the methods 300-1200 of FIGS. 3-12 may be initiated or controlled by a field-programmable gate array (FPGA) device, an application-specific integrated circuit (ASIC), a processing unit, such as a central processing unit (CPU), a digital signal processor (DSP), a controller, another hardware device, a firmware device, or any combination thereof. As an example, each of the methods 300-1200 of FIGS. 3-12 can be initiated or controlled by one or more processors included in, corresponding to, or coupled to the cloud storage system 150, the host device 130, the first data storage device 102, the second data storage device 108 of FIG. 1, the server 260, the network-based storage device 270, any of the host devices 280-284, the data storage device 202 of FIG. 2, or the data storage device 302, the host device 304, or the server 306 of FIG. 3. For example, the one or more processors may include the processor 132 of FIG. 1, the processor 262, the controller 272, or the controller 222 of FIG. 2.

A controller or a processor, such as the processor 132 of FIG. 1, the processor 262, the controller 272, or the controller 222 of FIG. 2, configured to perform the one or more of the methods 300-1200 of FIGS. 3-12 may be able to advantageously manage and/or control storage of data representing content stored in a data storage device. Although various components of the system 100 of FIG. 1 and the system 200 of FIG. 2 depicted herein are illustrated as block components and described in general terms, such components may include one or more microprocessors, state machines, or other circuits configured to enable the processor 132 of FIG. 1, the processor 262, the controller 272, or the controller 222 of FIG. 2 to perform operations described herein. One or more aspects of the processor 132 of FIG. 1, the processor 262, the controller 272, or the controller 222 of FIG. 2 may be implemented using a microprocessor or microcontroller programmed to perform operations described herein, such as one or more operations of the methods of FIGS. 3-12. In a particular embodiment, of the processor 132 of FIG. 1, the processor 262, the controller 272, or the controller 222 of FIG. 2 includes a processor executing instructions that are stored in a memory, such as the memory 136 of FIG. 1, the memory 266, the memory 274, or the non-volatile memory 204 of FIG. 2. Alternatively or additionally, executable instructions that are executed by the processor may be stored in a separate memory location that is not part of the memory 136 of FIG. 1, the memory 266, the memory 274, or the non-volatile memory 204 of FIG. 2, such as at a read-only memory (ROM).

The processor 132 of FIG. 1, the processor 262, the controller 272, or the controller 222 of FIG. 2 may be implemented using a microprocessor or microcontroller programmed to perform one or more operations of the methods 300-1200 of FIGS. 3-12. For example, the microprocessor or microcontroller may be configured to execute instructions (e.g., a series of instructions, such as an algorithm) to perform certain operations described herein. In a particular embodiment, the processor 132 of FIG. 1, the processor 262, the controller 272, or the controller 222 of FIG. 2 (e.g., the microprocessor or microcontroller) includes a processor executing instructions that are stored in the memory 136 of FIG. 1, the memory 266, the memory 274, or the non-volatile memory 204 of FIG. 2. Alternatively or alternatively, executable instructions that are executed by the processor may be stored in a separate memory location that is not part of the memory 136 of FIG. 1, the memory 266, the memory 274, or the non-volatile memory 204 of FIG. 2, such as at a read-only memory (ROM).

In a first illustrative example, a processor may execute the instructions to receive a request from a host device for an identifier and to provide the identifier to the host device. The instructions to receive the request may include instructions to parse the request, instructions to access the identifier from a storage location of the data storage device, instructions to generate and/or format a communication including the identifier, and/or instructions to send the communication to the host device, as illustrative, non-limiting examples. The processor executes instructions to receive a log file from the host device, the log file indicating content stored in the data storage device and including a user-identifier of the data storage device. The instructions to receive the log file may include instructions to detect a communication received from the host device, instructions to determine the communication includes the log file, and/or instructions to parse the log file from the communication, as illustrative, non-limiting examples. The processor may execute the instructions store the log file in the data storage device. The instructions to store the log file may include instructions to identify a portion of a memory to store the log file and/or instructions to format the log file for storage, as illustrative, non-limiting examples.

In a second illustrative example, a processor may execute the instructions to receive an identifier of a data storage device. The instructions to receive the identifier may include instructions to detect the data storage device is coupled to the host device, instructions to request the data storage device to send the identifier, instructions to identify a communication from the data storage device that includes the identifier, and/or instructions to parse the identifier from the communication, as illustrative, non-limiting examples. The processor executes instructions to communicate the identifier to a server of the cloud storage system via a network. The instructions to communicate the identifier may include instructions to determine the identifier, instructions to generate and/or format a communication including the identifier, and/or instructions to send the communication to the server, as illustrative, non-limiting examples. The processor may execute the instructions to, in response to receiving a message indicating that the identifier is not recognized at the server, determine whether the host device is authorized to send directory information associated with the data storage device to the server. The instructions to determine whether the host is authorized may include instructions to present a prompt via a user interface, instructions to detect a response to the prompt received via the user interface, and/or instructions to determine whether the host device is authorized based on the response, as illustrative, non-limiting examples. The processor may execute the instructions to send data descriptive of content stored in the data storage device to the server via the network based on a determination that the host device is authorized. The instructions to send the data may include instructions to request the data storage device to provide an indication of the content stored in the data storage device, instructions to receive an indication of the content of the data storage device, instructions to generate the data at the host device, and/or instructions to format the data to be communicated to the server, as illustrative, non-limiting examples.

In a third illustrative example, a processor may execute the instructions to receive an input based on a user-visible code associated with a data storage device, wherein the user-visible code corresponds to an identifier or a user-identifier of the data storage device. The instructions to receive the input may include instructions to detect the input received via a user interface, instructions to determine a format of the input, instructions to extract the identifier or the user-identifier from the input, and/or instructions to identify a link, such as an internet address, of a cloud storage service, as illustrative, non-limiting examples. The processor executes instructions to send first data associated with the identifier or the user-identifier to a server via a network. The instructions to send the first data may include instructions to extract the identifier or the user-identifier from the input and/or instructions format the identifier or the user-identifier to produce the first data, as illustrative, non-limiting examples. The processor may execute the instructions to receive, from the server at a first time, a copy of second data indicating content associated with the data storage device, the second data stored into a network-based storage device associated with the server at a second time prior to the first time. The instructions to receive the copy of the second data may include instructions to detect a communication received from the server, instructions to determine that the communication includes the copy of the second data, and/or instruction to parse the copy of the second data from the communication, as illustrative, non-limiting example. The processor may execute the instructions to provide an indication of the content via a user interface. The instructions to provide the indication may include instructions to format the copy of the second data into a presentable format, instructions to identify a user interface via which the indication of the content is to be provided, and/or instructions to send the formatted copy of the second data to the user interface as the indication of the content, as illustrative, non-limiting examples.

In a fourth illustrative example, a processor may execute the instructions to receive an identifier of a data storage device from a first host device via a network. The instructions to receive the identifier may include instructions to detect a first communication from the first host device, instructions to determine that the first communication includes the identifier, and/or instructions to parse the identifier from the first communication, as illustrative, non-limiting examples. The processor executes instructions to determine whether the identifier matches a registered identifier. The instructions to determine whether the identifier matches a registered identifier may include instructions to identify a data structure storing entries associated with one or more data storage devices, instructions to send the identifier to a controller of the data structure, instructions to instruct the controller to search for one or more entries that include the identifier, and instructions to receive a result from the controller based on the search, as illustrative, non-limiting examples. The processor may execute the instructions to, in response to determining that the identifier is not registered with the server, send a message indicating to the first host device that the identifier is unregistered. The instructions to send the message may include instructions to generate the message and/or instructions to format the message, as illustrative, non-limiting examples. The processor may execute the instructions to receive, from the first host device via the network after sending the message, data descriptive of content stored in the data storage device. The instructions to receive data descriptive of content stored in the data storage device may include instructions to detect a second communication from the first host device, instructions to determine that the second communication includes the data, and/or instructions to parse the data from the second communication, as illustrative, non-limiting example. The processor may execute the instructions to storing the data into a network-based storage device to be retrievable by the server. The instructions to update the data structure may include instructions to identify the data structure, instructions to send the data to the controller of the data structure, and/or instructions to instruct the controller to generate an entry corresponding to the data, as illustrative, non-limiting example.

In a particular illustrative embodiment, a host device, such as the host device 130 of FIG. 1, the host devices 280-284 of FIG. 2, or the host device 304 of FIG. 3, may include a processor and a memory storing instructions. The processor may be configured to execute the instructions to receive an identifier of a data storage device and communicate the identifier to a server via a network. In response to receiving a message indicating that the identifier is not recognized at the cloud storage system, the processor may be configured to determine whether the host device is authorized to send directory information associated with the data storage device to the server. The processor may be further configured to send data descriptive of content stored in the data storage device to the server via the network based on a determination that the host device is authorized.

In another particular illustrative embodiment, a host device, such as the host device 130 of FIG. 1, the host devices 280-284 of FIG. 2, or the host device 304 of FIG. 3, may include a processor and a memory storing instructions. The processor may be configured to execute the instructions to receive an input based on a user-visible code associated with a data storage device. The user-visible code corresponds to an identifier or a user-identifier of the data storage device. The processor may further be configured to send first data associated with the identifier or the user-identifier to a server via a network. The processor may also be configured to receive, from the server at a first time, a copy of second data indicating content associated data storage device. The second data may be stored into a network-based storage device associated with the server at a second time prior to the first time. The processor may be configured to provide an indication of the content via a user interface.

In another particular illustrative embodiment, a server, such as the server 260 of FIG. 2 or the server 306 of FIG. 3, may include a processor and a memory storing instructions. The processor may be configured to execute the instructions to receive an identifier of a data storage device from a first host device via a network. The processor may be further configured to determine whether the identifier matches a registered identifier. The processor may also be configured to, in response to determining that the identifier is not registered with the server, send a message indicating to the first host device that the identifier is unregistered. The processor may be configured to receive, from the first host device via the network after sending the message, data descriptive of content stored in the data storage device and to store the data into a network-based storage device to be retrievable by the server A host device, such as the host device 130 of FIG. 1, the host devices 280-284 of FIG. 2, or the host device 304 of FIG. 3, may include a mobile telephone, a music player, a video player, a gaming console, an electronic book reader, a personal digital assistant (PDA), a computer, such as a laptop computer, a notebook computer, or a tablet, any other electronic device, or any combination thereof. The host device may communicate via a host controller, such as a processor 132 of FIG. 1, which may enable the host device to read data from and to write data to a data storage device, such as the first data storage device 102, the second data storage device 108 of FIG. 1, the data storage device 202 of FIG. 2, or the data storage device 302 of FIG. 3. The host device may operate in compliance with a JEDEC Solid State Technology Association industry specification, such as an embedded MultiMedia Card (eMMC) specification or a Universal Flash Storage (UFS) Host Controller Interface specification. The host device may operate in compliance with one or more other specifications, such as a Secure Digital (SD) Host Controller specification, as an illustrative, non-limiting example.

A data storage device, such as the first data storage device 102, the second data storage device 108 of FIG. 1, the data storage device 202 of FIG. 2, or the data storage device 302 of FIG. 3, may be configured to be coupled to the host device, such as the host device 130 of FIG. 1, the host devices 280-284 of FIG. 2, or the host device 304 of FIG. 3, as embedded memory, such as in connection with an eMMC configuration, as an illustrative, non-limiting example. The data storage device may correspond to an eMMC device. As another example, the data storage device may correspond to a memory card, such as a Secure Digital (SD®) card, a microSD® card, a miniSD™ card (trademarks of SD-3C LLC, Wilmington, Del.), a MultiMediaCard™ (MMC™) card (trademark of JEDEC Solid State Technology Association, Arlington, Va.), or a CompactFlash® (CF) card (trademark of SanDisk Corporation, Milpitas, Calif.). The data storage device may operate in compliance with a JEDEC industry specification. For example, the data storage device may operate in compliance with a JEDEC eMMC specification, a JEDEC Universal Flash Storage (UFS) specification, one or more other specifications, or a combination thereof.

In a particular embodiment, the data storage device, such as the first data storage device 102, the second data storage device 108 of FIG. 1, the data storage device 202 of FIG. 2, or the data storage device 302 of FIG. 3, may be attached to, or embedded within, one or more host devices, such as within a housing of a portable communication device. For example, the data storage device may be within a packaged apparatus such as a wireless telephone, a personal digital assistant (PDA), a gaming device or console, a portable navigation device, a computer device (e.g., a tablet or a laptop), or other device that uses internal non-volatile memory. However, in other embodiments, the data storage device may be a portable device configured to be selectively coupled to one or more external devices. For example, the data storage device may be a removable device such as a Universal Serial Bus (USB) flash drive or a removable memory card, as illustrative examples. In a particular embodiment, a non-volatile memory of the data storage device, such as the non-volatile memory 204 of FIG. 2, includes a flash memory (e.g., NAND, NOR, Multi-Level Cell (MLC), Divided bit-line NOR (DINOR), AND, high capacitive coupling ratio (HiCR), asymmetrical contactless transistor (ACT), or other flash memories), an erasable programmable read-only memory (EPROM), an electrically-erasable programmable read-only memory (EEPROM), a read-only memory (ROM), a one-time programmable memory (OTP), or any other type of memory.

The illustrations of the embodiments described herein are intended to provide a general understanding of the various embodiments. The illustrations are not intended to serve as a complete description of all of the elements and features of apparatus and systems that utilize the structures or methods described herein. Other embodiments may be utilized and derived from the disclosure, such that structural and logical substitutions and changes may be made without departing from the scope of the disclosure. Although specific embodiments have been illustrated and described herein, it should be appreciated that any subsequent arrangement capable of achieving the same or similar purpose or functionality may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description. Accordingly, the disclosure and the figures are to be regarded as illustrative rather than restrictive.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
    in a first data storage device that includes a controller coupled to a non-volatile memory, performing by the controller:
        receiving a first log file from a host device, the first log file associated with a thumbnail indicating content stored in the non-volatile memory of the first data storage device and including a first user-identifier of the first data storage device, the first user-identifier received via a user input at the host device and configured to identify the first data storage device among a plurality of data storage devices; and
        storing the first log file in the non-volatile memory of the first data storage device, wherein:
            a first copy of the first log file is associated with a user account and stored in a cloud-based storage device,
            a second copy of a second log file is associated with the user account and stored in the cloud-based storage device, the second copy of the second log file indicating content stored in a second data storage device of the plurality of data storage devices and including a second user-identifier of the second data storage device, the second data storage device distinct from the first data storage device, and
            the first copy of the first log file and the second copy of the second log file are each:
                accessible to a user device having access to the user account, and
                selectable by the user device by use of the first user-identifier or the second user-identifier.

2. The method of claim 1, wherein:
    the first log file is generated at the host device based on host device access to the content in the non-volatile memory of the first data storage device, and
    the first user-identifier comprises a designator of the first data storage device that is provided by a user of the host device.

3. The method of claim 1, wherein:
    the second log file indicates content stored in a second non-volatile memory of the second data storage device,
    the first user-identifier is distinct from an identifier of the first data storage device, and
    the identifier is set by a manufacturer of the first data storage device.

4. The method of claim 1, wherein:
    the first data storage device further includes a housing, and
    the housing includes a user-visible code that is associated with the first user-identifier.

5. The method of claim 1, wherein the first user-identifier is distinct from a media digital identifier provided by a manufacturer of the first data storage device.

6. The method of claim 1, wherein the user device includes a user interface configured to display contents stored in the first data storage device or the second data storage device without connection of the first data storage device or the second data storage device, respectively, to the user device.

7. The method of claim 1, wherein:
    the first log file indicates a directory structure and file names of content items stored in the first data storage device, and
    the first log file further includes, for at least one content item stored in the first data storage device, a file name, a file type, and a media thumbnail.

8. The method of claim 1, wherein:
    the first log file further includes a graphical indicator of media content stored in the first data storage device, and
    the graphical indicator includes the thumbnail associated with a content item stored in the first data storage device.

9. The method of claim 1, wherein the user account corresponds to a service provided by a cloud-based storage service to a user of the first data storage device.

10. The method of claim 1, further comprising:
receiving an updated version of the first log file from the host device; and
storing the updated version of the first log file in the first data storage device.

11. The method of claim 10, wherein the host device transmits a copy of the updated version of the first log file to the cloud-based storage device.

12. An apparatus comprising:
a data storage device comprising a memory and a controller operatively coupled to the memory, the controller configured to:
receive a first log file from a host device, wherein the first log file includes at least one of a graphical indicator and a media thumbnail, the at least one of the graphical indicator and the media thumbnail indicating one or more of media content and a content item stored in the data storage device, and the first log file further including a first user-identifier of the data storage device; and
store the first log file in the data storage device, wherein a first copy of the first log file is associated with a user account and stored in a network-based storage device that is located remotely from the host device and that contains a second copy of a second log file that includes a second user-identifier of a second data storage device associated with the user account, such that the first copy of the first log file and the second copy of the second log file are each accessible to a user device having access to the user account and further are each selectable by the user device by use of the first user-identifier or the second user-identifier.

13. The apparatus of claim 12, wherein the first user-identifier is usable as an index to retrieve the first log file from the network-based storage device.

14. The apparatus of claim 12, wherein:
the first user-identifier is distinct from an identifier of the data storage device,
the identifier includes a media digital identifier provided by a manufacturer of the data storage device, and
the first user-identifier is provided by a user of the data storage device.

15. The apparatus of claim 14, further comprising a housing, wherein the housing includes a user-visible code that is associated with the identifier.

16. The apparatus of claim 15, wherein the user-visible code includes a quick response (QR) code, a micro-QR code, or a bar code.

17. A data storage device comprising:
first means for storing data in a non-volatile memory, the first means for storing data associated with a user-visible code that includes a label, a quick response (QR) code, a micro-QR code, or a bar code; and
means for receiving a first log file from a processor and for storing the first log file into the first means for storing data, wherein:
the first log file includes a first user-identifier of the first means for storing data and identifiers of content items stored in the first means for storing data, the first user-identifier:
received via means for providing a user input located at the processor; and
identifying the first means for storing data,
a first copy of the first log file is stored in third means for storing data,
the third means for storing data is distinct from the processor and configured to store the first copy of the first log file in a cloud-based network in association with a second copy of a second log file that includes a second user-identifier of second means for storing data, and
the first log file and the second log file are associated with a single user account such that the first copy of the first log file and the second copy of the second log file are each accessible to means for providing user access, the means for providing user access having access to the user account, and further are each selectable by the means for providing user access based on the first user-identifier and the second user-identifier.

18. The data storage device of claim 17, wherein the first user-identifier is usable as an index to retrieve the first log file from the third means for storing data.

19. The data storage device of claim 17, wherein:
the first user-identifier is distinct from an identifier of the data storage device,
the identifier includes a media digital identifier provided by a manufacturer of the data storage device, and
the first user-identifier is provided by a user of the data storage device.

20. The data storage device of claim 19, further comprising means for housing the first means for storing, wherein the user-visible code is located on the means for housing.

* * * * *